(12) United States Patent
Kitagawa et al.

(10) Patent No.: US 12,056,629 B2
(45) Date of Patent: Aug. 6, 2024

(54) BOOTH RESERVATION SYSTEM, NON-TRANSITORY COMPUTER READABLE MEDIUM STORING PROGRAM, AND BOOTH RESERVATION METHOD

(71) Applicant: FUJIFILM Business Innovation Corp., Tokyo (JP)

(72) Inventors: Nobuhiro Kitagawa, Kanagawa (JP); Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 130 days.

(21) Appl. No.: 17/461,944

(22) Filed: Aug. 30, 2021

(65) Prior Publication Data
US 2022/0300864 A1    Sep. 22, 2022

(30) Foreign Application Priority Data
Mar. 12, 2021   (JP) .................................. 2021-040591

(51) Int. Cl.
*G06Q 10/02*   (2012.01)
*G05B 15/02*   (2006.01)

(52) U.S. Cl.
CPC ............. *G06Q 10/02* (2013.01); *G05B 15/02* (2013.01)

(58) Field of Classification Search
CPC ................................ G06Q 10/02; G05B 15/02
USPC ............................................................ 705/5
See application file for complete search history.

(56) References Cited

U.S. PATENT DOCUMENTS

| 9,921,726 | B1* | 3/2018 | Sculley | H04W 4/30 |
|---|---|---|---|---|
| 9,955,318 | B1* | 4/2018 | Scheper | G06Q 10/02 |
| 10,433,646 | B1* | 10/2019 | Schmidt | A47C 7/748 |
| 10,827,829 | B1* | 11/2020 | Labrosse | G05B 15/02 |
| 2017/0006162 | A1* | 1/2017 | Bargetzi | H04N 7/147 |
| 2018/0174076 | A1* | 6/2018 | Fukami | H04W 12/08 |
| 2019/0197636 | A1* | 6/2019 | Mukundala | G06Q 50/12 |

FOREIGN PATENT DOCUMENTS

| CN | 108055334 | * | 5/2018 | ............. G06Q 10/02 |
|---|---|---|---|---|
| CN | 112188700 | * | 1/2021 | ........... H05B 47/165 |
| CN | 112188700 A | * | 1/2021 | ........... H05B 47/165 |
| JP | 2001279938 |   | 10/2001 | |

OTHER PUBLICATIONS

Billetto, How to Pick the Right Style of Conference (captured Jan. 12, 2021) (Year: 2021).*

* cited by examiner

*Primary Examiner* — Jeff Zimmerman
*Assistant Examiner* — Mark C Clare
(74) *Attorney, Agent, or Firm* — JCIPRNET

(57) ABSTRACT

An information processing system includes a processor configured to acquire reservation information for a booth, and give an instruction for change related to a disposed object that is disposed inside and/or outside the booth based on the acquired reservation information.

17 Claims, 20 Drawing Sheets

BOOTH RESERVATION SYSTEM, NON-TRANSITORY COMPUTER READABLE MEDIUM STORING PROGRAM, AND BOOTH RESERVATION METHOD

CROSS-REFERENCE TO RELATED APPLICATIONS

This application is based on and claims priority under 35 USC 119 from Japanese Patent Application No. 2021-040591 filed Mar. 12, 2021.

BACKGROUND

(i) Technical Field

The present invention relates to an information processing system, a non-transitory computer readable medium storing a program, and an information processing method.

(ii) Related Art

JP2001-279938A discloses a configuration in which a space unit includes a steel frame including a base frame, and a desk is incorporated inside the steel frame.

SUMMARY

A booth is used by various users with different ages, genders, physiques, and the like. A purpose of using the booth is not uniform, and the booth is used for various purposes such as work and breaks.

Aspects of non-limiting embodiments of the present disclosure relate to an information processing system, a non-transitory computer readable medium storing a program, and an information processing method that can improve convenience when a user uses a booth in which a disposed object is disposed compared with a case where a disposed object disposed inside or outside the booth is not changed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including a processor configured to acquire reservation information for a booth, and give an instruction for change related to a disposed object that is disposed inside and/or outside the booth based on the acquired reservation information.

BRIEF DESCRIPTION OF THE DRAWINGS

Exemplary embodiment(s) of the present invention will be described in detail based on the following figures, wherein.

Figure 9:
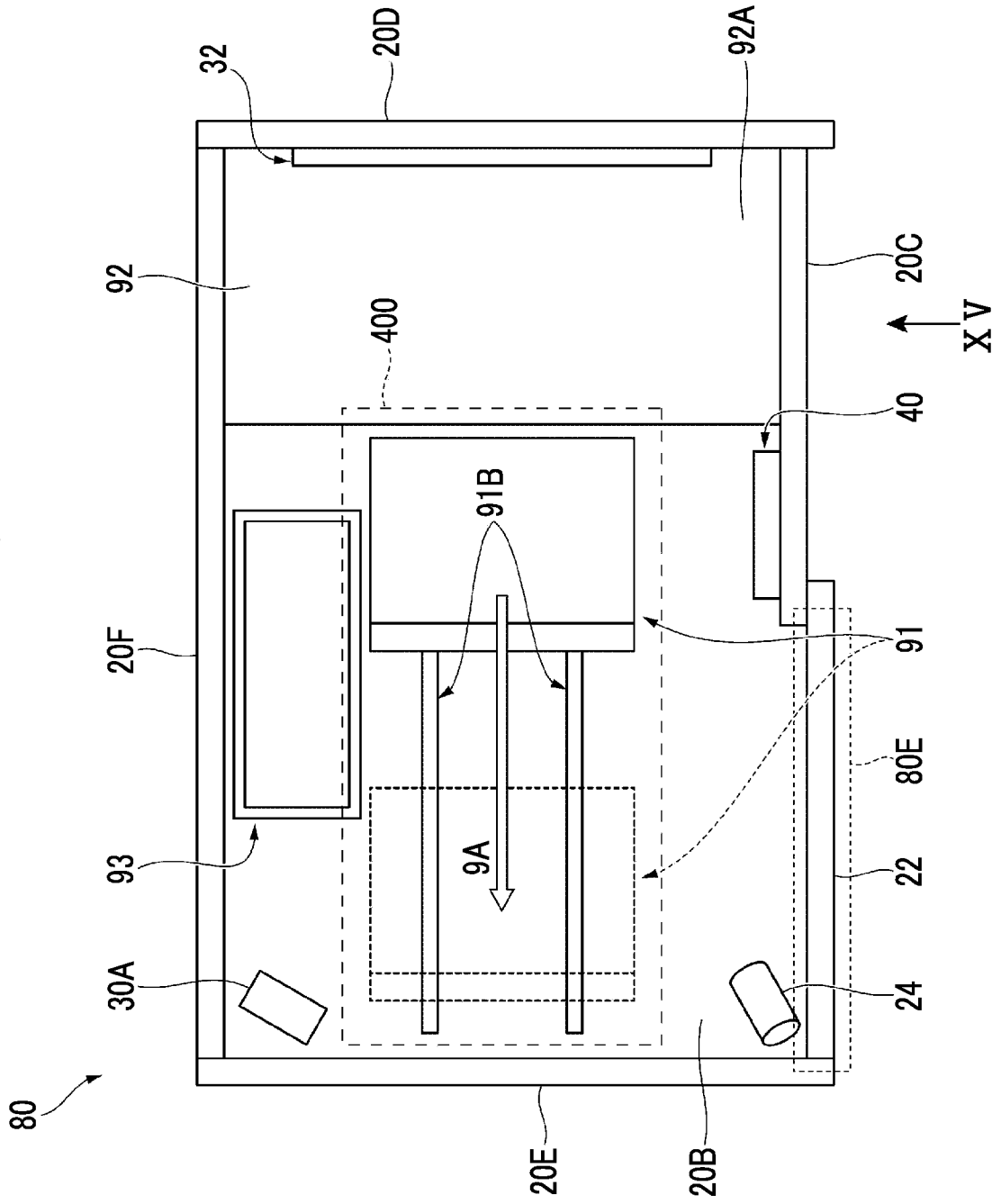
FIG. 9 is a diagram showing motion of a chair in the booth.
Figure 13:
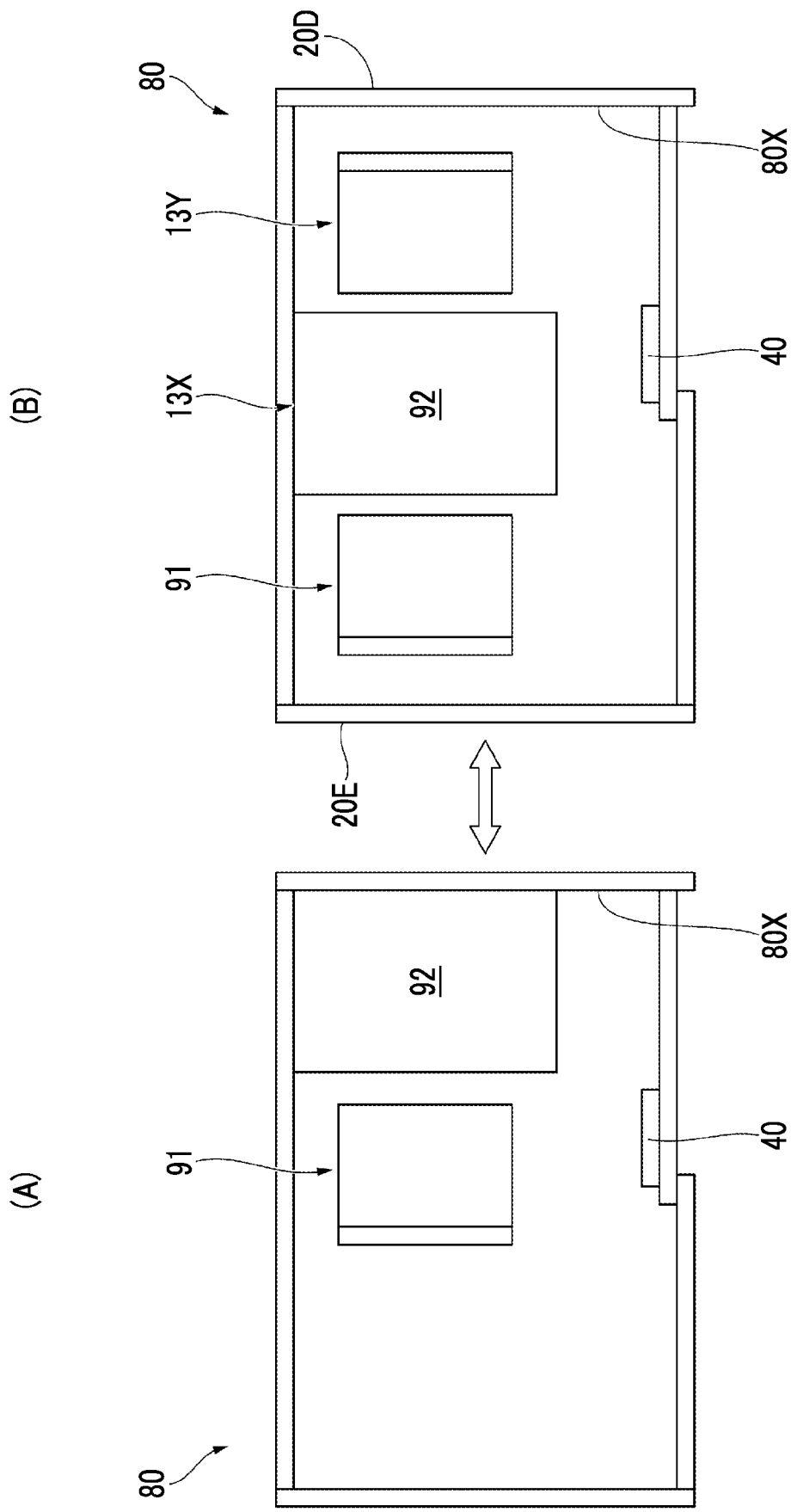
Figure 14:
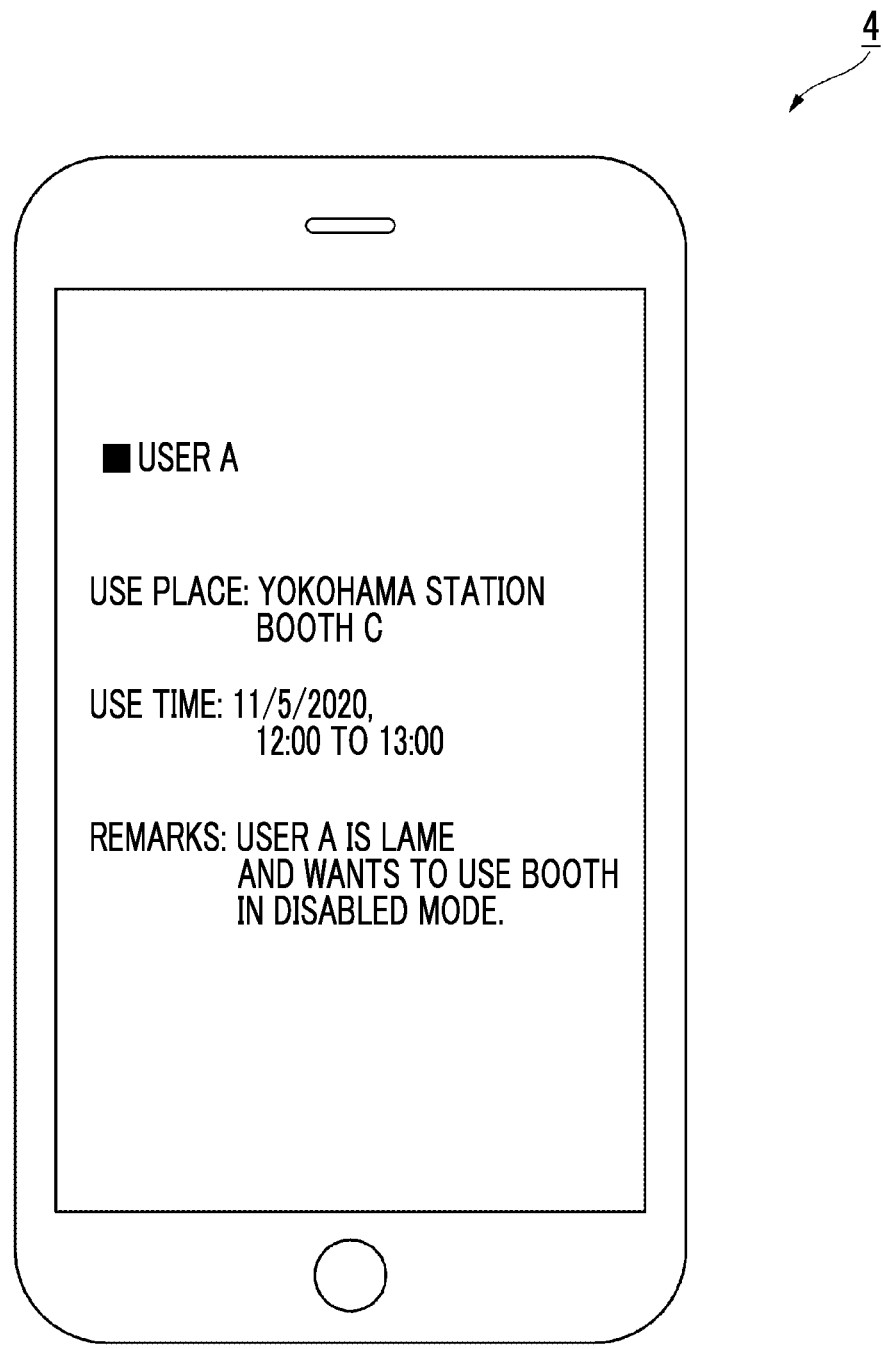
Figure 15:
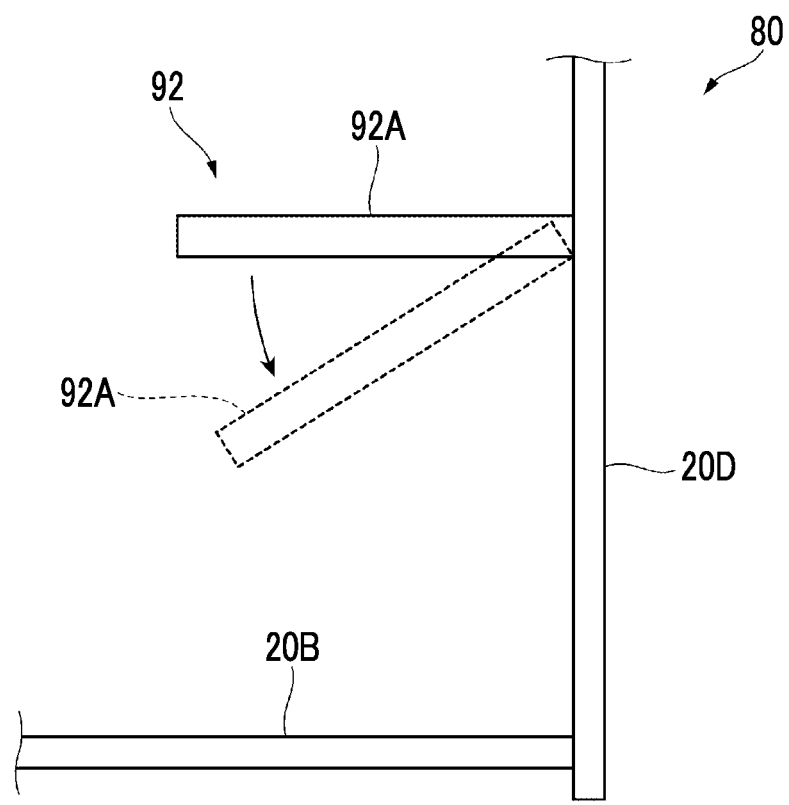
Figure 16:
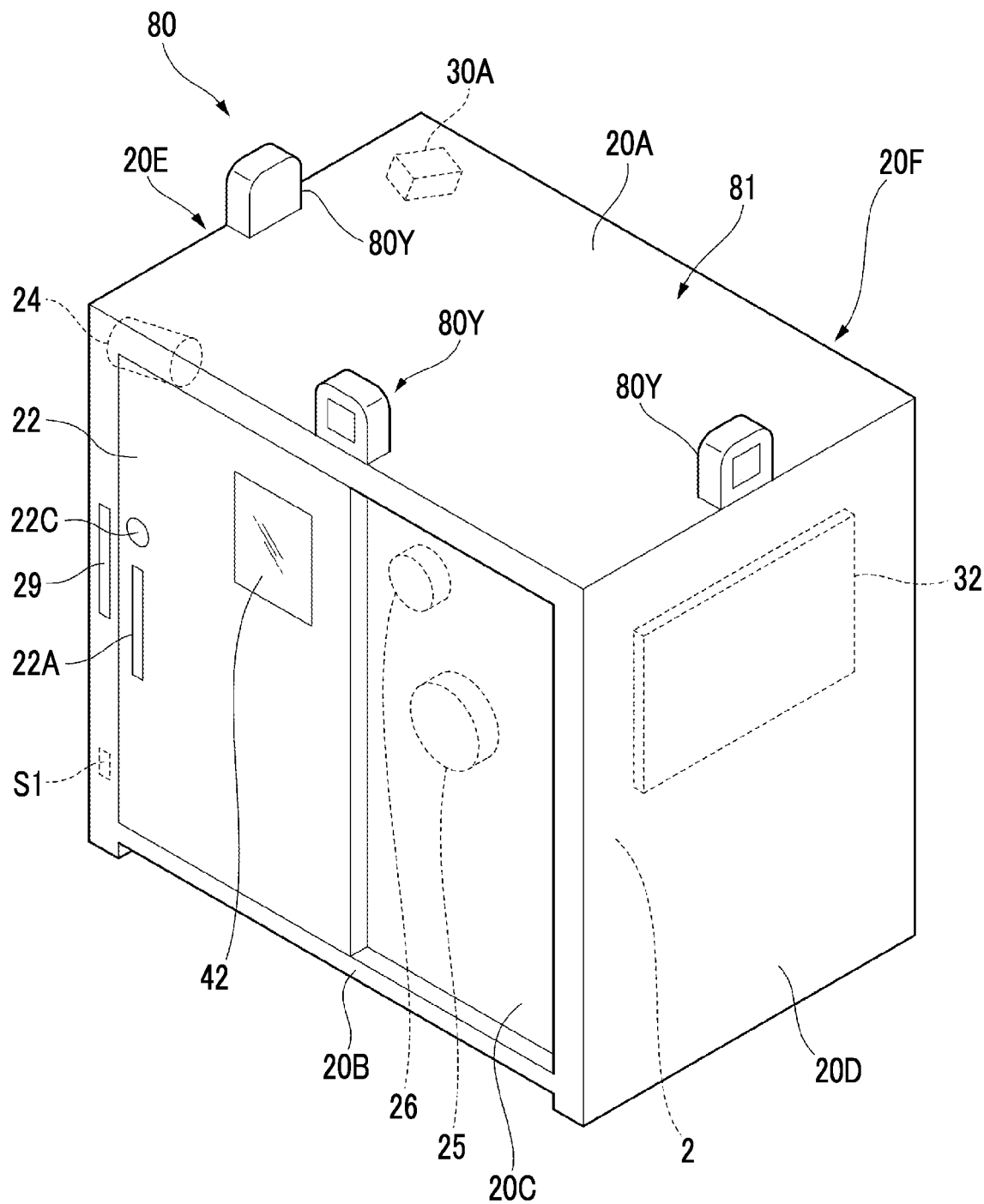
Figure 17:
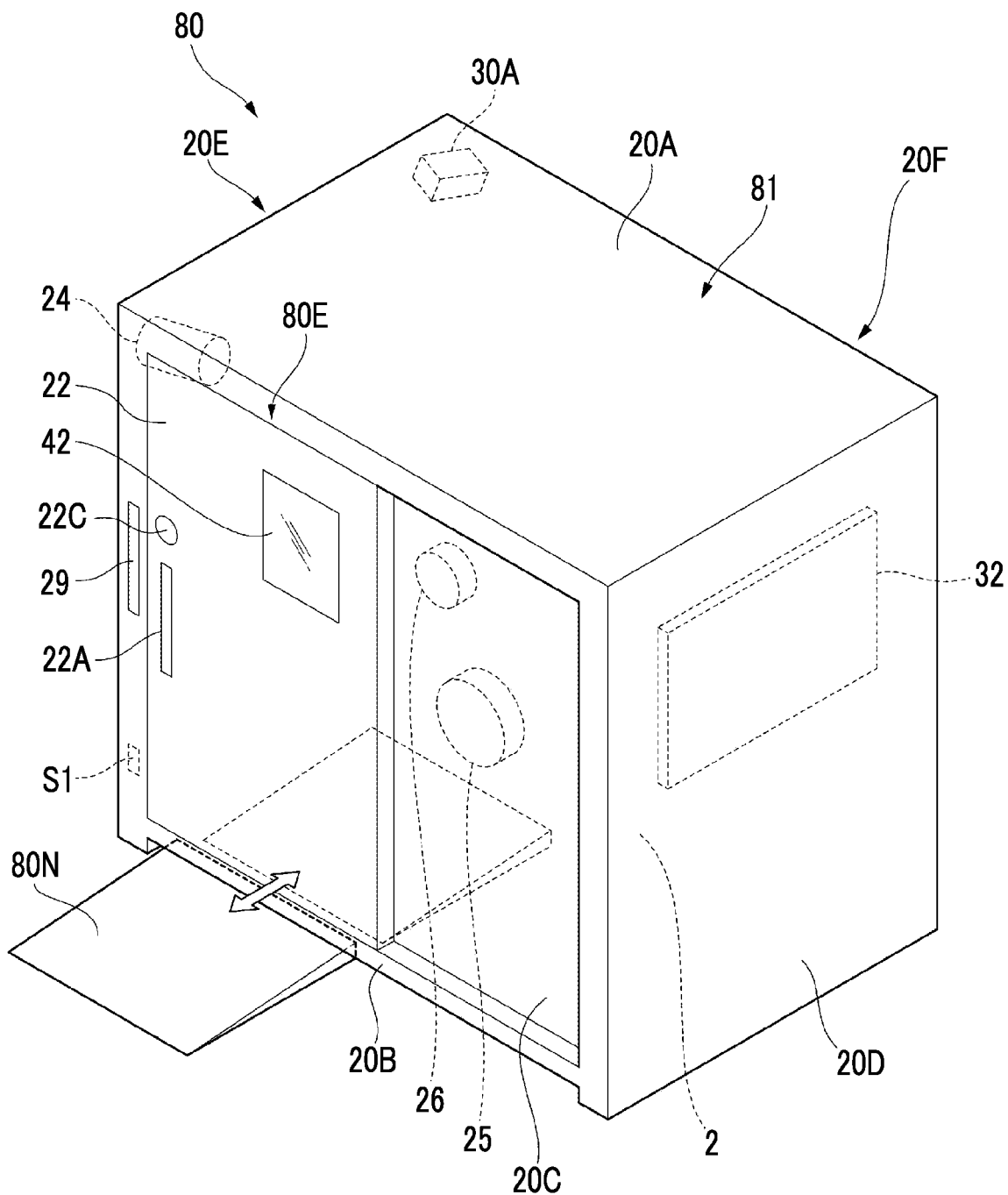
Figure 18:
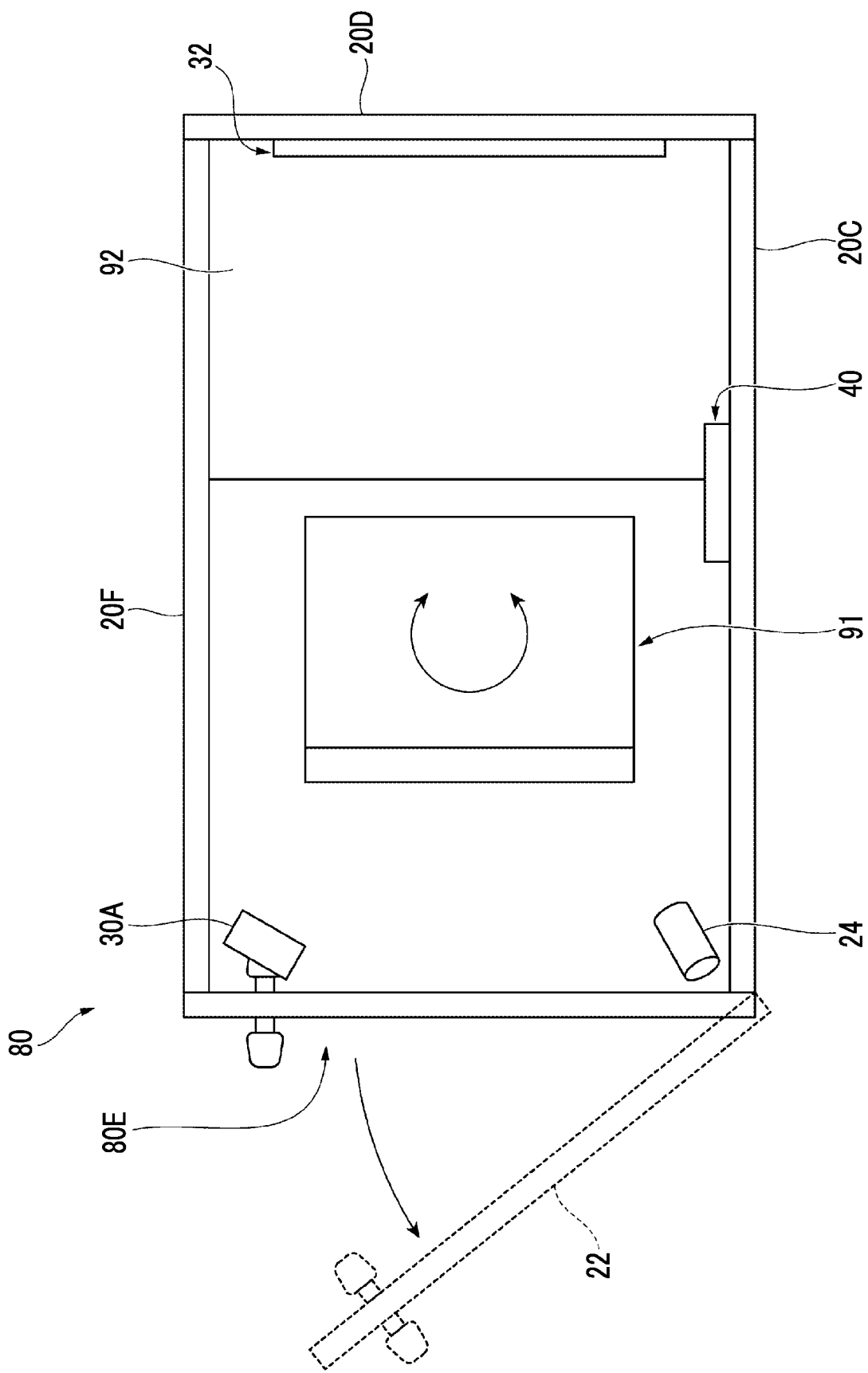
Figure 19:
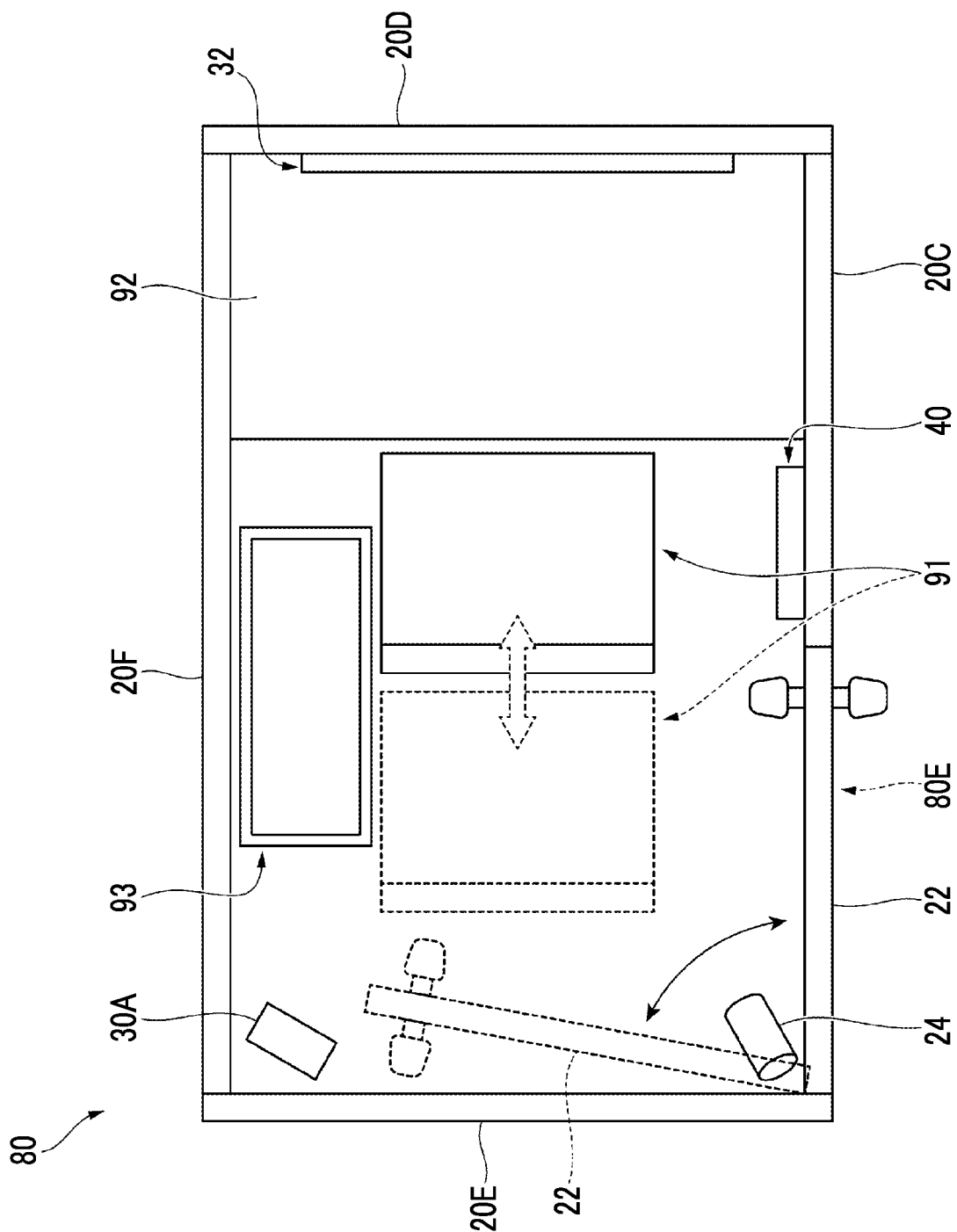
Figure 20:
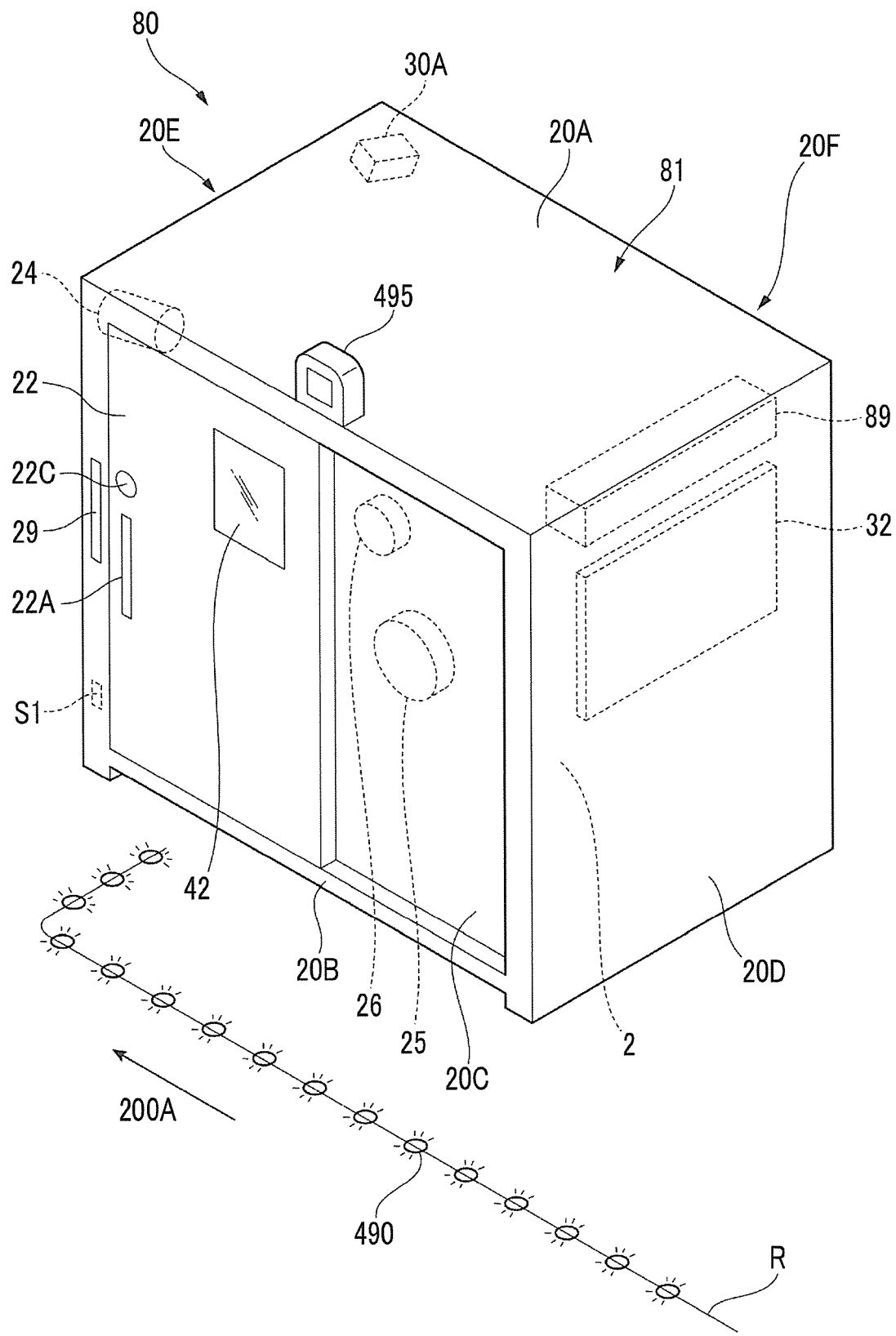

Parts (A) and (B) in FIG. 13 are diagrams showing still other configuration examples of the booth;

FIG. 14 is a diagram showing an example of a display screen displayed on the user terminal when the booth is reserved;

FIG. 15 is a diagram showing a state in a case where a desk is viewed from a direction indicated by an arrow XV in FIG. 9;

FIG. 16 is a diagram showing still another configuration example of the booth;

FIG. 17 is a diagram showing still another configuration example of the booth;

FIG. 18 is a diagram showing still another configuration example of the booth;

FIG. 19 is a diagram showing still another configuration example of the booth; and FIG. 20 is a diagram showing still another configuration example of the booth.

DETAILED DESCRIPTION

Hereinafter, exemplary embodiments of the present invention will be described with reference to the drawings.

Figure 1:
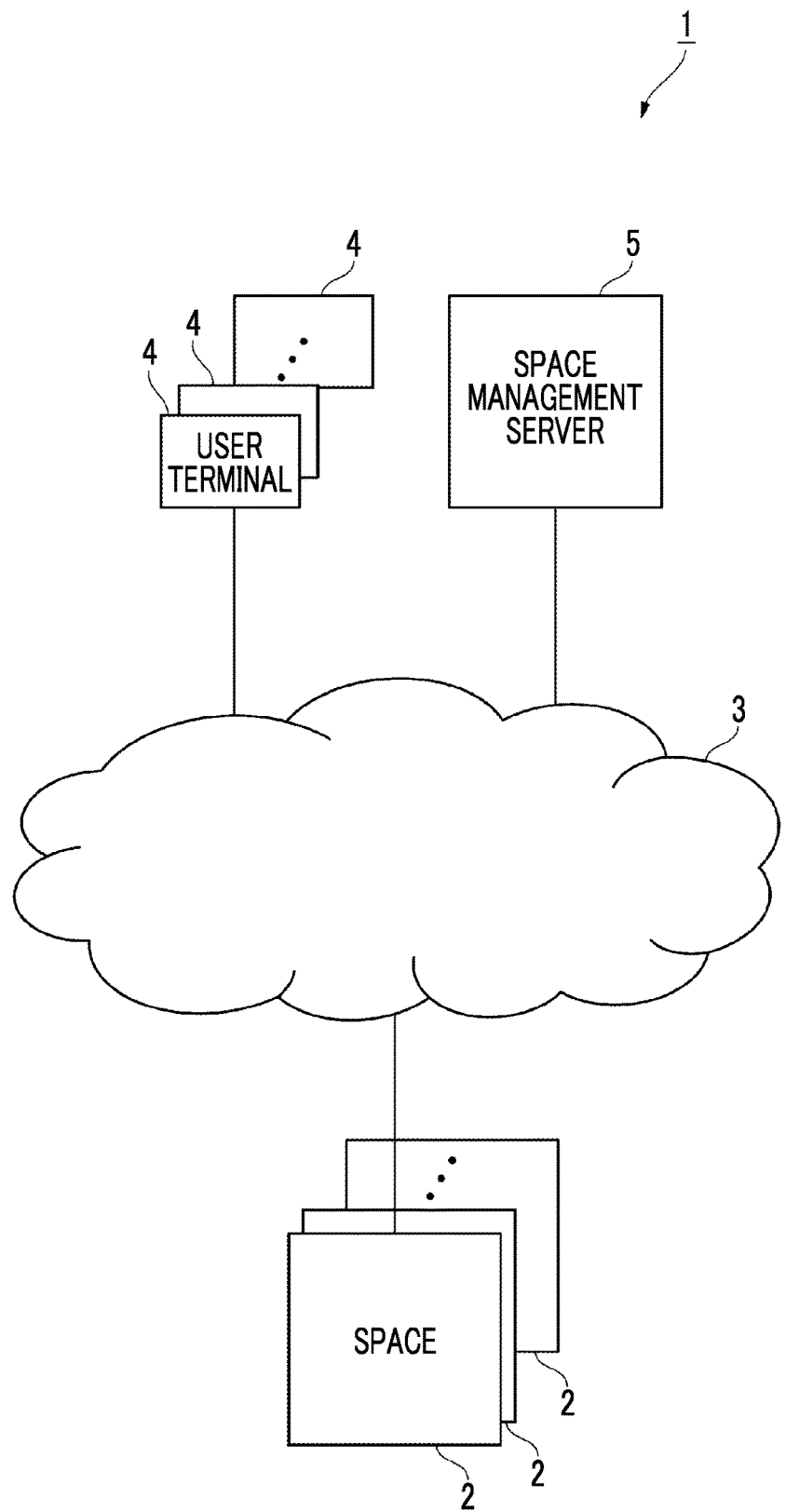
FIG. 1 is a diagram schematically showing an overall configuration of an information processing system.

FIG. 1 is a diagram schematically showing the overall configuration of an information processing system 1 according to the present exemplary embodiment.

In the present exemplary embodiment, a plurality of spaces 2 that are examples of places reserved and used by users are provided.

In the present exemplary embodiment, each of the spaces 2 can be reserved, and the user reserves the space 2 in advance and then uses the space 2.

The space 2 as an example of a reservation target includes a booth, a guest room such as an accommodation facility, and a conference room in a company and the like. These are examples of the space 2 separated from the surroundings by a wall, a partition, or the like.

The space 2 in the present exemplary embodiment includes a table, a seat, or the like for which a service is provided at a restaurant, a barber shop, or the like. These are examples of the space 2 open to the surroundings.

An information processing system 1 shown in FIG. 1 is configured with various terminals connected to a cloud network 3.

In FIG. 1, as an example of a terminal connected to the cloud network 3, a user terminal 4 operated by a user and a space management server 5 as an example of an information processing apparatus that manages the space 2 are shown. The space 2 is connected to the cloud network 3. More specifically, various apparatuses are provided in the space 2, and these apparatuses are connected to the cloud network 3.

In the present exemplary embodiment, an electronic lock is attached to a door of the space 2, and each of the spaces 2 can be locked. In the present exemplary embodiment, a person who has the authority to unlock the space 2 can use the space 2.

Ina case of unlocking the space 2, the person performing unlocking operates the user terminal 4 thereof to give an instruction for the unlocking. This instruction is sent to the space management server 5, and the space management server 5 receives the instruction. The space management server 5 gives an instruction for unlocking the space 2 that the instruction for unlocking has been given. Consequently, the electronic lock installed in the space 2 is activated, and the space 2 is unlocked.

In the present exemplary embodiment, a portable smartphone is assumed as the user terminal 4. However, the portable user terminal 4 may be a so-called wearable terminal, a notebook computer, or a game terminal.

The space management server 5 manages various types of information related to the space 2. The space management server 5 manages, for example, information for specifying a user, information for specifying the space 2 that is a reservation target, the start date and time of the reservation, and the end date and time of the reservation.

The information for specifying a user includes, for example, the name, the gender, the age, an account, a user ID, a password of a user, and management information attached to an individual. The information for specifying the space 2 that is a use target includes, for example, information for specifying an address or a location, and a name or a number for management.

The space management server 5 also functions as a control apparatus and controls various apparatuses installed in the space 2. The control apparatus may be installed in each space 2 so as to correspond to each of the spaces 2. In this case, the control apparatus installed in each space 2 controls various apparatuses installed in each space 2.

Figure 2:
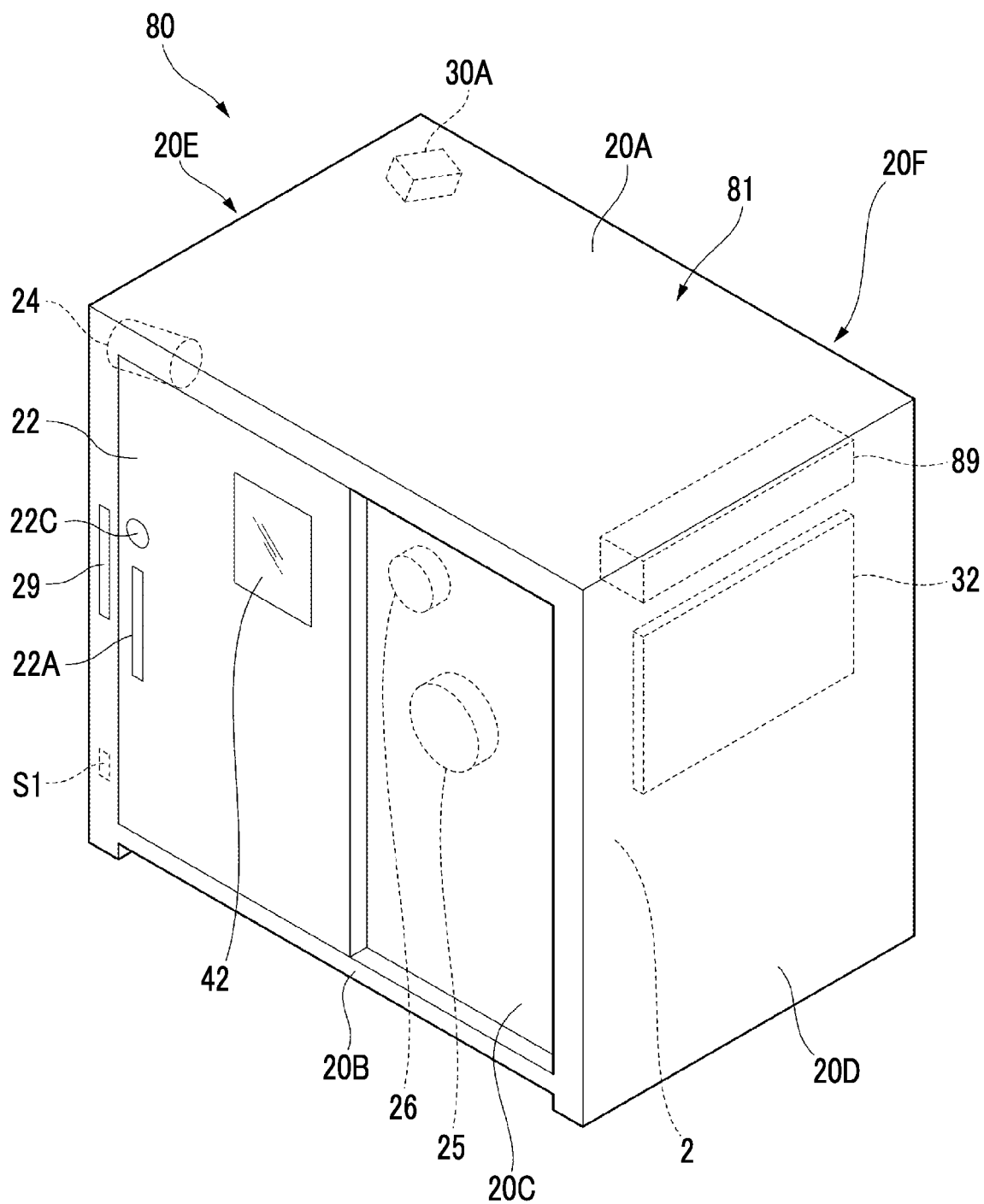
FIG. 2 is a diagram showing a booth.

FIG. 2 is a diagram showing a booth 80 as an example of the space 2.

In the example shown in FIG. 2, the inside of the booth 80 is the space 2 that is a reservation target, and, in the present exemplary embodiment, the space 2 inside the booth 80 can be reserved.

The booth 80 of the present exemplary embodiment may be disposed indoors or outdoors, for example, in a station yard, an airport, an office building, a commercial facility such as a restaurant or a department store, a bank, a library, an art museum, a museum, a public institution or facility, a connecting passage, a park, etc.

The booth 80 shown in FIG. 2 is a closed type booth 80 to which a ceiling is attached.

Here, the "closed type" does not indicate a sealed type, but refers to a state having practical soundproofing performance.

The "booth 80" refers to a structure in which a partition for partitioning the space 2 and another space located around the space 2 is present. Here, partitions are not necessarily present on all four sides of the space 2, and even a structure in which partitions are not in some sides corresponds to the booth 80.

For example, in the space 2 used by a user while sitting, even a configuration in which there are two partitions only on the right side and the left side of the user corresponds to the booth 80.

The ceiling is not necessarily provided, and even a structure in which there is no ceiling corresponds to the booth 80.

The booth 80 shown in FIG. 2 is provided with a housing 81 that configures a part of the booth 80. The housing 81 is formed in a rectangular parallelepiped shape.

The booth 80 has a ceiling 20A, a floor surface 20B, a sidewall 20C to which a door 22 that can be opened and closed is attached, two sidewalls 20D and 20E located on both sides of the sidewall 20C, and a sidewall 20F located on a side facing the door 22.

In the present exemplary embodiment, the space 2 is surrounded by the sidewall 20C, the door 22, the sidewall 20D, the sidewall 20E, and the sidewall 20F, and the space 2 is provided inside the four sidewalls and the door 22.

In other words, in the present exemplary embodiment, the space 2 is provided inside the housing 81.

In the present exemplary embodiment, the door 22 is assumed to be a sliding door that is movable along the sidewall 20C. In the case of FIG. 2, the door 22 is a one-sided sliding door 22 that slides in one direction, but may be a sliding door 22 that is opened and closed by crossing two or more members, or a hinged door 22 that slides two members left and right.

A handle 22A gripped by the user when opening and closing the door 22 is attached to the door 22. The handle is also provided inside the door 22.

An electronic lock 22C that enables unlocking and locking of the door 22 is attached to the door 22. In the present exemplary embodiment, an opening/closing sensor S1 for detecting opening/closing of the door 22 is provided.

The number of people using the booth 80 is substantially determined by a volume of the booth 80. The booth 80 in the present exemplary embodiment is basically assumed to be a private room type used by one person. However, the booth 80 may be a large booth 80 that can accommodate a large number of people.

The private room type does not indicate that only one person can use the booth, but indicates that a small number of people, for example, two or three persons can use the booth.

Any shape or structure of the housing 81 configuring the booth 80 may be used, and any apparatus or performance thereof provided may be provided.

Figure 3:
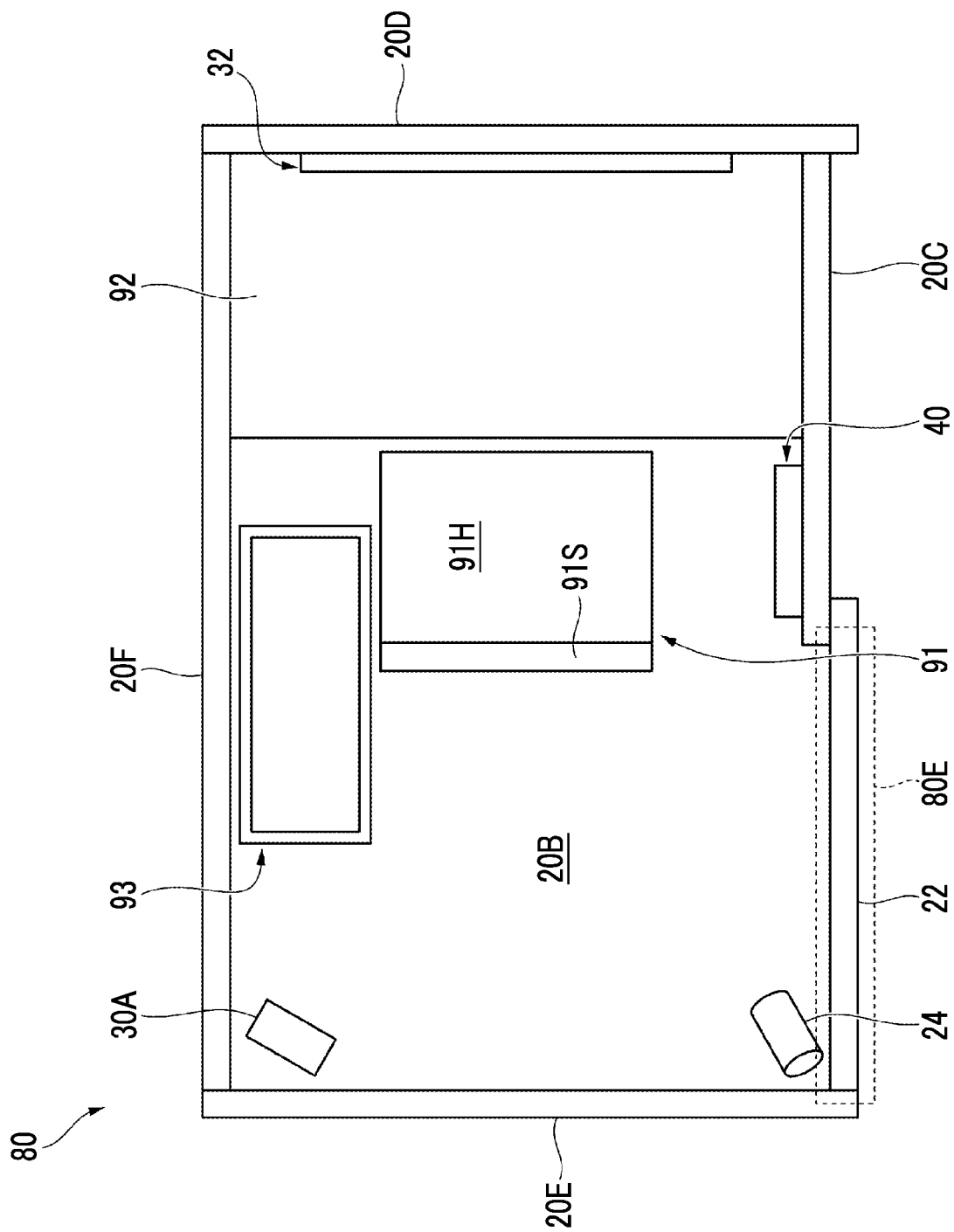
FIG. 3 is a diagram showing the inside of the booth.

FIG. 3 is a diagram showing the inside of the booth 80. FIG. 3 shows a state in a case where the booth 80 is viewed from above.

In the present exemplary embodiment, a single desk 92 and a single chair 91 are disposed inside the booth 80. The chair 91 has a seat surface 91H that supports the buttocks of a user from below, and a backrest 91S that supports the back of the user in a sitting state.

In the present exemplary embodiment, the chair 91 is movable. Although not shown in FIG. 3, a guide portion that guides the chair 91, such as a guide rail, is provided on the floor surface of the booth 80. In the present exemplary embodiment, a movement mechanism that moves the chair 91 is provided.

The guide portion and the movement mechanism will be described later.

In the booth 80, a luggage container 93 in which a user puts luggage thereof is installed. In addition, the luggage container 93 for accommodating the luggage placed by the user is provided in the booth 80.

As an installed apparatus, a monitor 32 that is a display device displaying images is provided inside the booth 80 as shown in FIGS. 2 and 3.

In the present exemplary embodiment, as shown in FIGS. 2 and 3, a speaker 30A that is a sound output device outputting sound is provided. The speaker 30A may not be provided separately, and the sound may be output from a speaker provided in the monitor 32.

In the present exemplary embodiment, as shown in FIGS. 2 and 3, an imaging device 24 imaging the inside of the booth 80 is provided. The imaging device 24 is provided with an imaging element such as a CCD or a CMOS, and the imaging device 24 uses the imaging element to image the inside of the booth 80.

As shown in FIG. 2, the booth 80 is provided with a human sensor 25 detecting a user inside the booth 80. In the present exemplary embodiment, a temperature sensor 26 detecting a temperature inside the booth 80 is provided.

As shown in FIG. 3, a lighting apparatus 40 brightening the inside of the booth 80 is provided in the booth 80.

In the present exemplary embodiment, as shown in FIG. 2, a window 42 is installed in the door 22, and, in the present exemplary embodiment, the inside of the space 2 can be visually recognized from the outside of the space 2 through the window 42.

As shown in FIG. 2, an information acquisition device 29 acquiring individual information of a user who uses the booth 80 may be provided on an outer surface of the booth 80.

The information acquisition device 29 is configured with, for example, a reader that reads an ID card that is put thereon. The information acquisition device 29 may be a reader or the like that reads a user's fingerprint, arrangement of veins, or the like.

Although not shown, the booth 80 is provided with an air conditioner adjusting a temperature inside the booth 80. As shown in FIG. 2, the booth 80 is provided with a booth control device 89 that controls each portion of the booth 80.

In the present exemplary embodiment, as shown in FIG. 3, the portion where the closed door 22 is located is an entrance portion 80E of the booth 80.

Figure 4:
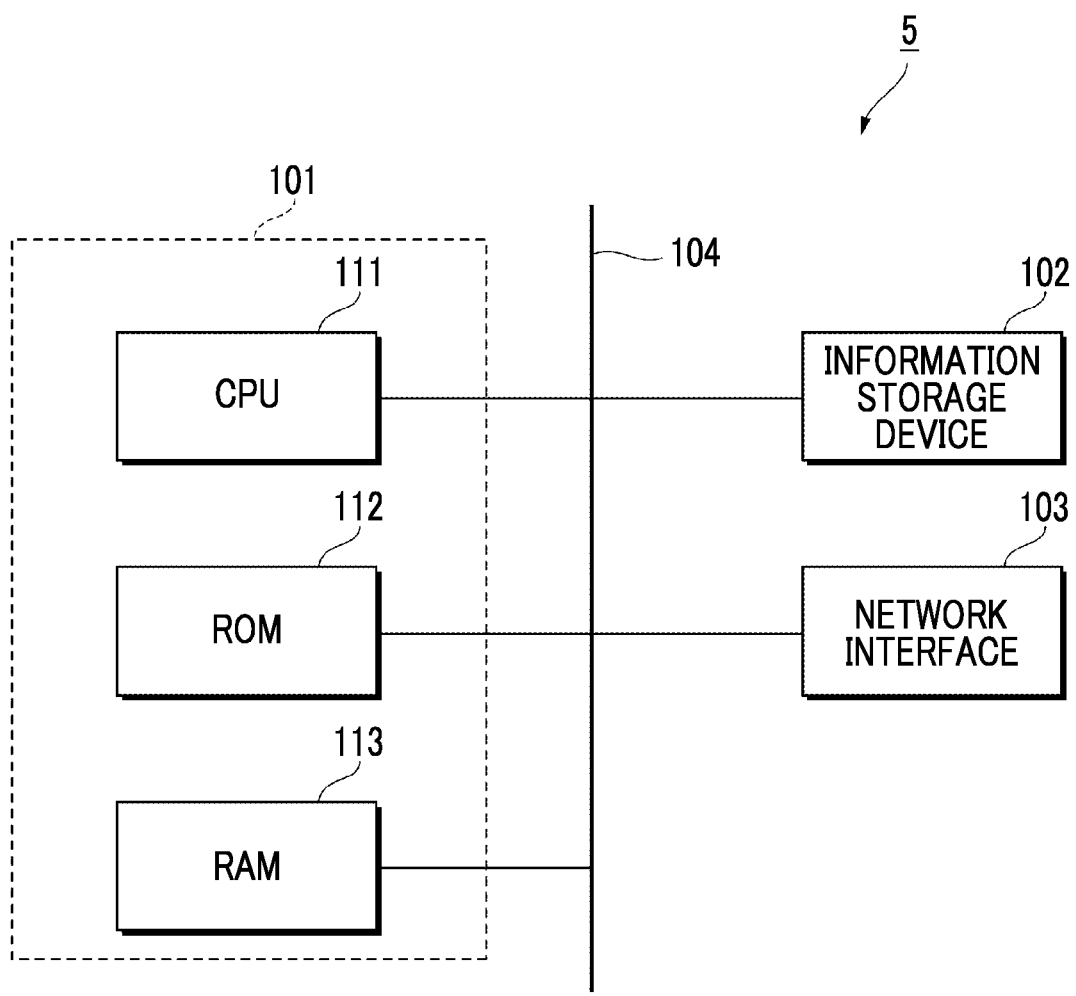
FIG. 4 is a diagram showing an example of a hardware configuration of a space management server.

FIG. 4 is a diagram showing an example of a hardware configuration of the space management server 5.

The space management server 5 as an example of the information processing apparatus has a control unit 101 that controls an operation of the entire apparatus, an information storage device 102 that stores information, and a network interface 103 that realizes communication via a local area network (LAN) cable or the like.

The control unit 101 has a central processing unit (CPU) 111 as an example of a processor, a read only memory (ROM) 112 in which basic software, a basic input output system (BIOS), and the like are stored, and a random access memory (RAM) 113 that is used as a work area.

The CPU 111 may be multi-cores. The ROM 112 may be a rewritable non-volatile semiconductor memory. The control unit 101 is a so-called computer.

The information storage device 102 is configured with, for example, a hard disk drive. However, the information storage device 102 may be a semiconductor memory or a magnetic tape.

The space management server 5 also includes input devices such as a keyboard and a mouse, and a display device such as a liquid crystal display as necessary.

The control unit 101, the information storage device 102, and the network interface 103 are connected to each other via a bus 104 or a signal line (not shown).

Here, a program executed by the CPU 111 may be provided to the space management server 5 in a state of being stored in a computer-readable recording medium such as a magnetic recording medium (a magnetic tape, a magnetic disk, or the like), an optical recording medium (an optical disk or the like), a magnetooptical recording medium, or a semiconductor memory, which are connected to each other via a bus 207 or a signal line (not shown).

The program executed by the CPU 111 may be provided to the space management server 5 by using communication means such as the Internet.

Figure 5:
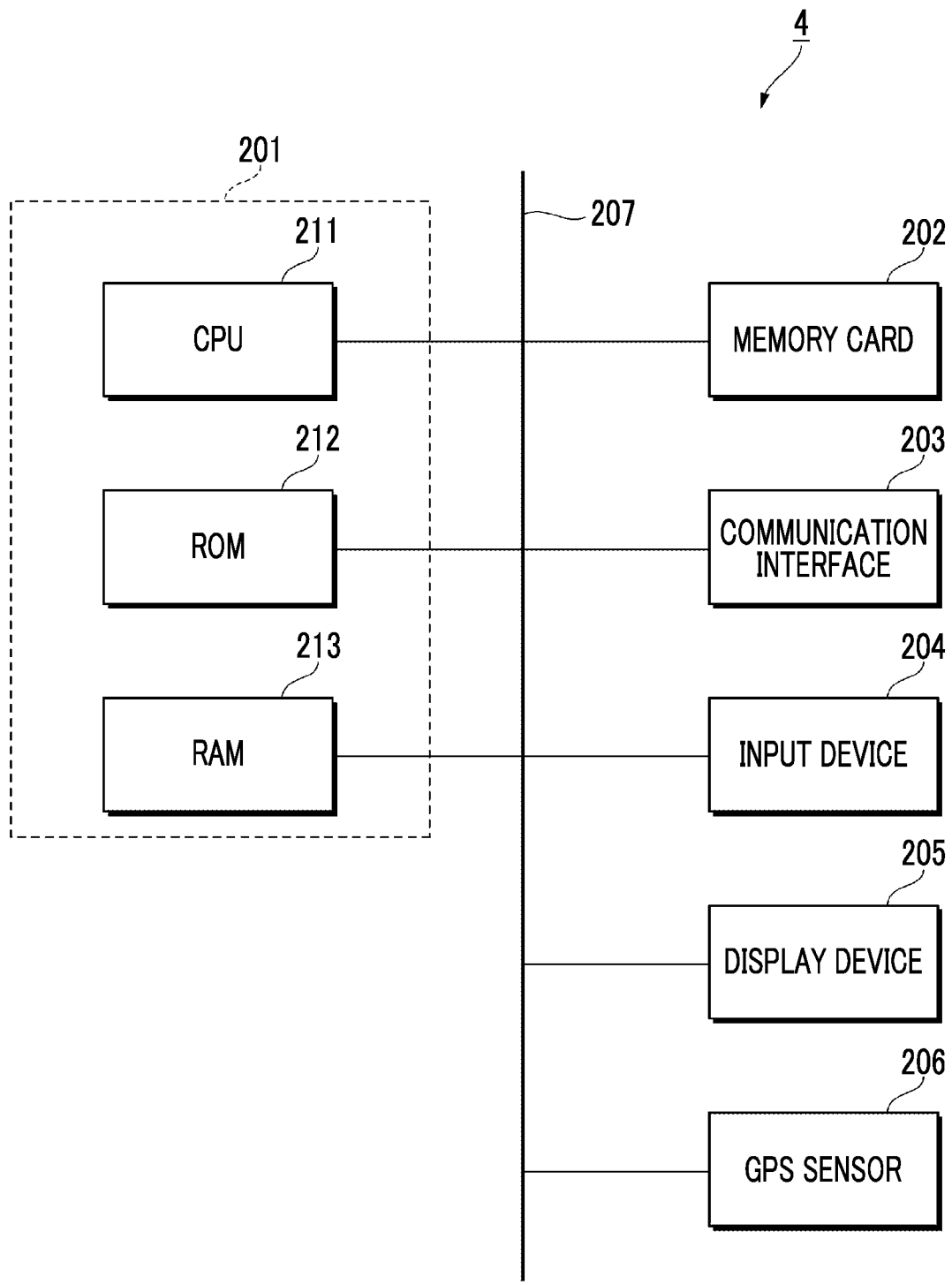
FIG. 5 is a diagram showing an example of a hardware configuration of a user terminal.

FIG. 5 is a diagram showing an example of a hardware configuration of the user terminal 4. In the configuration shown in FIG. 5, a case where the user terminal 4 is a smartphone is assumed.

The user terminal 4 has a control unit 201 that controls an operation of the entire apparatus, a memory card 202 that stores various data, various communication interfaces 203 that comply with wireless communication standards, an input device 204 such as a touch sensor, a display device 205 such as a liquid crystal display or an organic electroluminescence (EL) display, and a global positioning system (GPS) sensor 206.

The control unit 201 has a CPU 211, a ROM 212 in which firmware, a BIOS, and the like are stored, and a RAM 213 used as a work area. The CPU 211 may be multi-cores. The ROM 212 may be a rewritable non-volatile semiconductor memory.

The communication interface 203 is, for example, an interface used for connection to a mobile communication system or an interface used for connection to a wireless LAN.

The GPS sensor 206 is a sensor that receives radio waves from GPS satellites and measures a position of the user terminal 4. Latitude, longitude, and altitude information output from the GPS sensor 206 provides the current position of the user terminal 4. The GPS sensor 206 may be compatible with an indoor positioning system.

Figure 6:
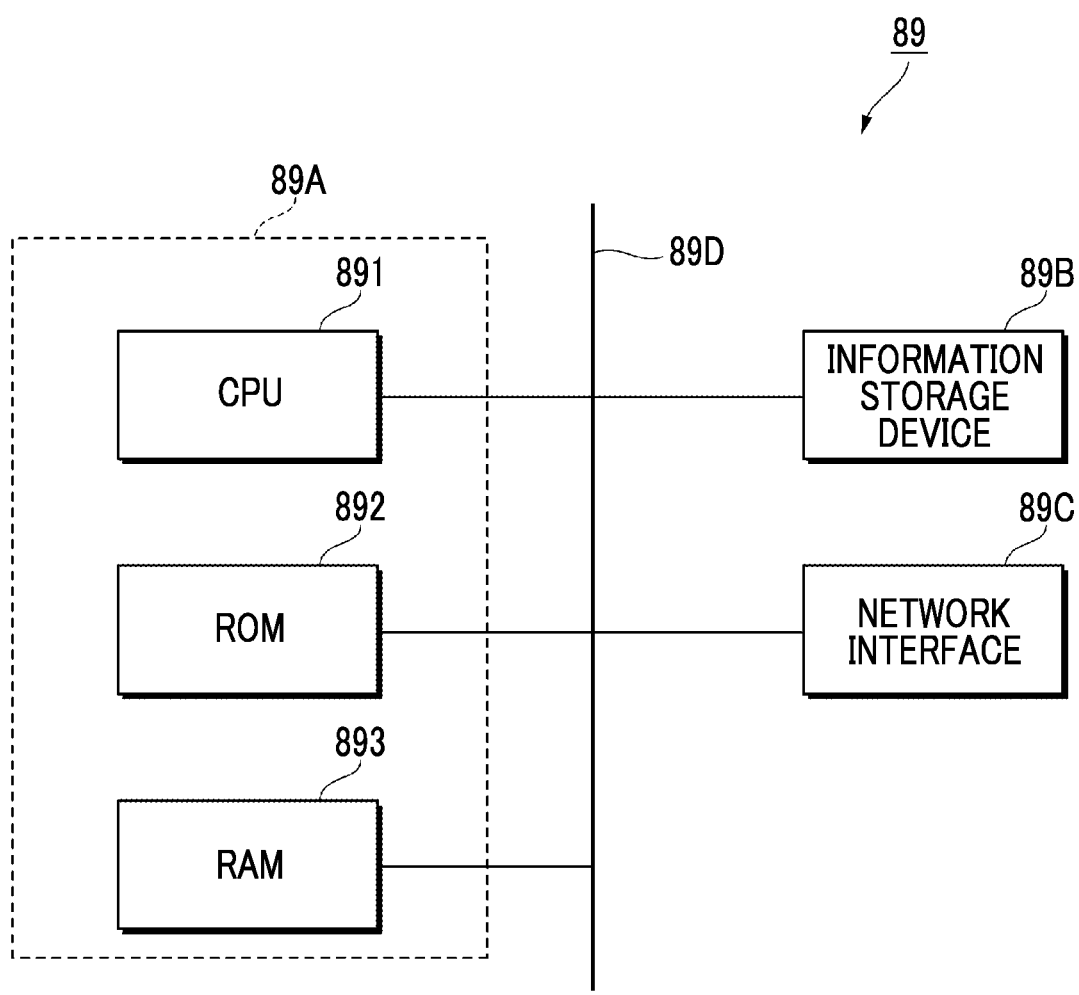
FIG. 6 is a diagram showing an example of a hardware configuration of a booth control device provided in the booth.

FIG. 6 is a diagram showing an example of a hardware configuration of the booth control device 89 (refer to FIG. 2) provided in the booth 80.

The booth control device 89 has an information processing unit 89A, an information storage device 89B that stores information, and a network interface 89C that realizes communication via a local area network (LAN) cable or the like.

The information processing unit 89A has a central processing unit (CPU) 891 as an example of a processor, a read only memory (ROM) 892 in which basic software, a basic input output system (BIOS), and the like are stored, and a random access memory (RAM) 893 that is used as a work area.

The CPU 891 may be multi-cores. The ROM 892 may be a rewritable non-volatile semiconductor memory. The information processing unit 89A is a so-called computer.

The information storage device 89B is configured with, for example, a hard disk drive. However, the information storage device 89B may be a semiconductor memory or a magnetic tape.

The information processing unit 89A, the information storage device 89B, and the network interface 89C are connected to each other via a bus 89D or a signal line (not shown).

Here, a program executed by the CPU 891 may be provided to the booth control device 89 in a state of being stored in a computer readable recording medium such as a magnetic recording medium (a magnetic tape, a magnetic disk, or the like), an optical recording medium (an optical disk or the like), a magnetooptical recording medium, or a semiconductor memory.

The program executed by the CPU 891 may be provided to the booth control device 89 by using communication means such as the Internet.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Various processes described below may be performed by using one information processing apparatus provided with a processor, or may be performed by using a plurality of information processing apparatuses each provided with a processor.

The information processing system 1 of the present exemplary embodiment may be configured such that one information processing apparatus provided with a processor executes processes, and the information processing system 1 of the present exemplary embodiment each may include a plurality of information processing apparatuses, and the processes may be distributed and executed by using the plurality of information processing apparatuses.

Figure 7:
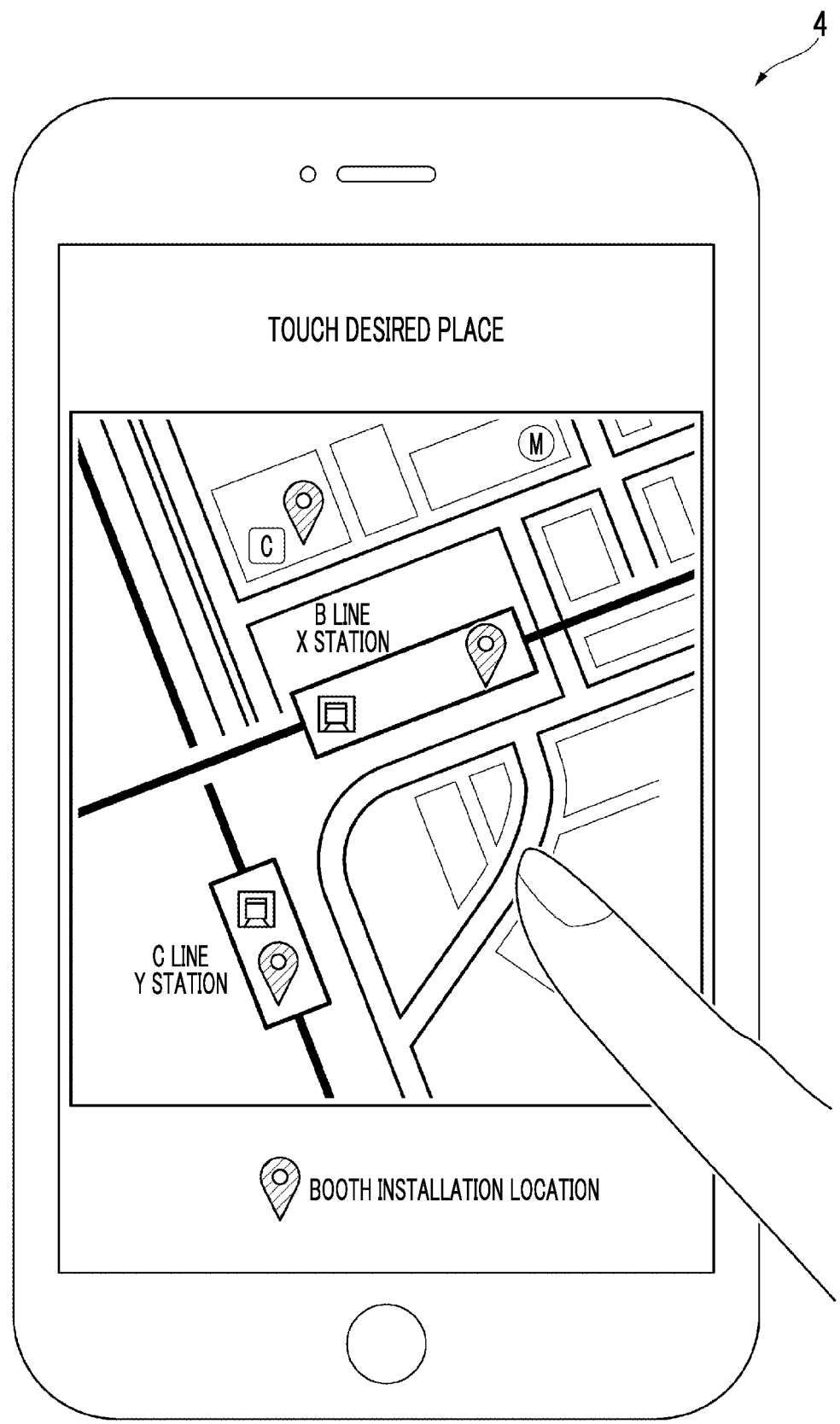
FIG. 7 is a diagram showing an example of a display screen displayed on a user terminal of a user of the booth when the user reserves the booth.

FIG. 7 is a diagram showing an example of a display screen displayed on the user terminal 4 of a user when the user of the booth 80 reserves the booth 80.

A map is displayed on the display screen shown in FIG. 7, and a plurality of installation locations of the booth 80 are displayed on the map.

In the present exemplary embodiment, when reserving the booth 80, first, the user of the booth 80 selects an installation location from among the plurality of displayed installation locations.

The present exemplary embodiment is not limited to such a display form, and, for example, a plurality of installation locations may be displayed in a list form, and the user may select an installation location from the list.

Figure 8:
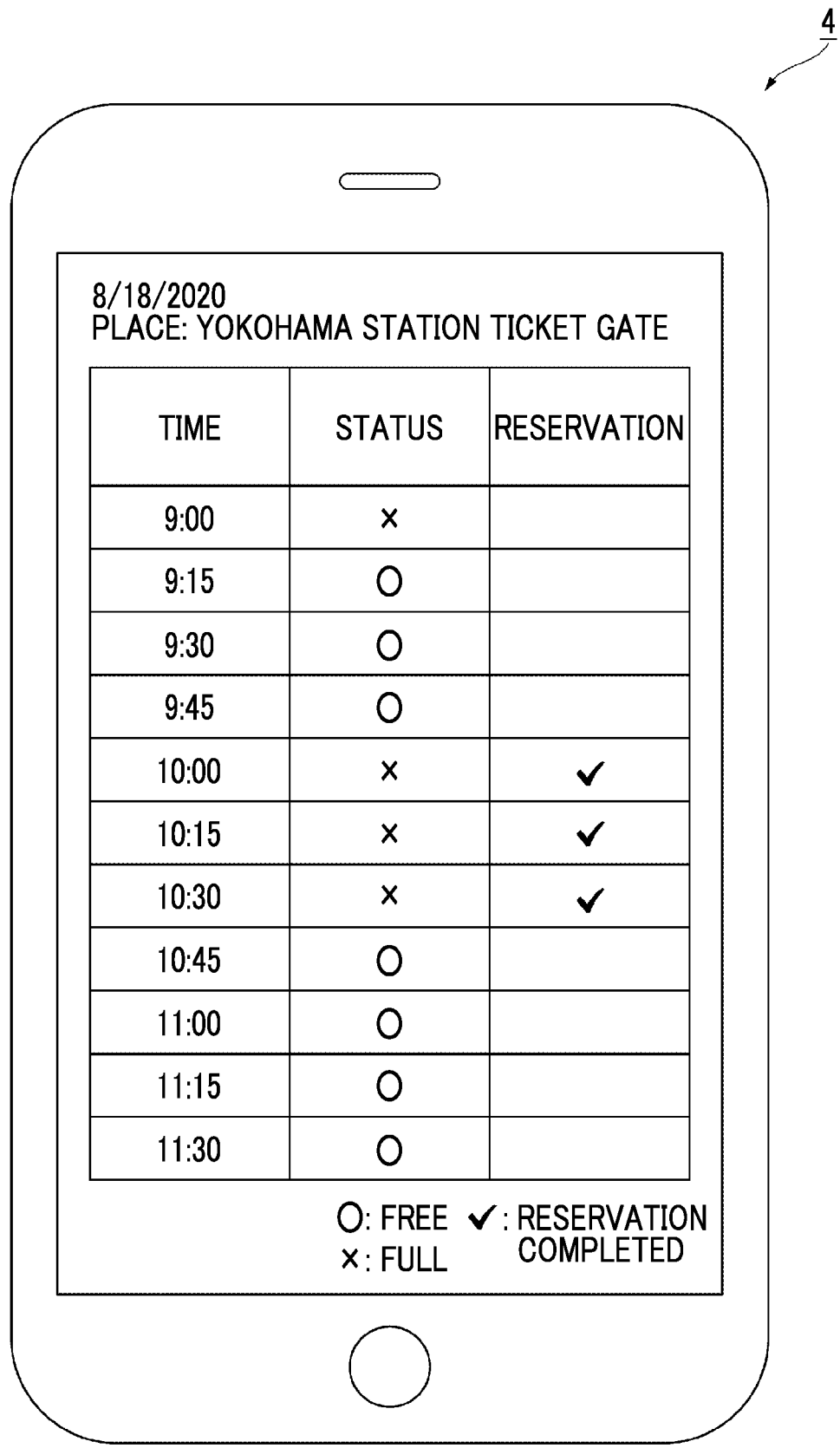
FIG. 8 is a diagram showing another example of a display screen displayed on the user terminal.

In a case where the installation location is selected, as shown in FIG. 8 (a diagram showing another example of the display screen displayed on the user terminal 4), a vacancy status at the selected installation location is displayed hourly on the user terminal 4.

The user performs an operation on the display screen to designate a reservation time for the booth 80. The user presses a confirmation button (not shown).

Consequently, the space management server 5 performs a reservation confirmation process.

Specifically, the space management server 5 receives information regarding the installation location of the booth 80 and the reservation time, and then registers the information regarding the installation location and the reservation time in the information storage device 102 (FIG. 4) to perform the reservation confirmation process. A confirmation result of the reservation is transmitted to the user terminal 4 and the reservation person is notified thereof.

Next, a process of changing a disposed object that is disposed in the booth 80 will be described.

In the present exemplary embodiment, the CPU 111 (refer to FIG. 4) as an example of a processor provided in the space management server 5 acquires reservation information for the booth 80.

Specifically, in the present exemplary embodiment, the booth 80 is reserved by a plurality of users, and the CPU 111 acquires information regarding a reservation for each reservation. Specifically, the CPU 111 acquires information regarding a reservation start time or a reservation end time and information regarding a user who is making the reservation for each reservation.

Then, the CPU 111 gives an instruction for change related to a disposed object disposed in the booth 80 based on the acquired reservation information.

Specifically, the CPU 111 gives an instruction for changing, for example, a position of the disposed object disposed in the booth 80 based on the acquired reservation information. Specifically, the CPU 111 gives an instruction for changing a positional relationship between, for example, the entrance portion 80E of the booth 80 (refer to FIG. 3) and the disposed object disposed in the booth 80 based on the acquired reservation information.

More specifically, the CPU 111 gives an instruction for changing a positional relationship between, for example, the entrance portion 80E of the booth 80 and the chair 91 that is an example of the disposed object based on the acquired reservation information.

In other words, the entrance portion 80E of the booth 80 is an opening through which a user using the booth passes, and the CPU 111 gives an instruction for changing a positional relationship between the opening of the booth 80 and the chair 91 based on the acquired reservation information.

The "chair 91" is an example of a disposed object that touches the user using the booth 80. Other disposed objects touching the user using the booth 80 include, for example, a handrail and a handle. The phrase "touching the user" is not limited to being directly touched with the body of the user, but also includes being touched with the body of the user via clothes of the user.

In the present exemplary embodiment, the CPU 111 gives an instruction for change related to the chair 91 touching the user who uses the booth 80 based on the acquired reservation information. Specifically, the CPU 111 gives an instruction for changing a positional relationship between the chair 91 and the entrance portion 80E of the booth 80.

In a case where the CPU 111 gives this instruction, the booth control device 89 (refer to FIG. 6) provided in the booth 80 performs control on the chair 91 based on the instruction.

In other words, in a case where the CPU 111 gives the instruction, the CPU 891 (refer to FIG. 6) as an example of a processor provided in the booth control device 89 performs control on the chair 91 based on the instruction.

Consequently, as indicated by an arrow 9A in FIG. 9 (a diagram showing motion of the chair 91 in the booth 80), the chair 91 disposed in the booth 80 is moved, and the chair 91 comes close to the entrance portion 80E of the booth 80.

More specifically, in this example, when the reservation start time for the booth 80 comes, the booth control device 89 performs control on the chair 91, and, when the reservation start time for the booth 80 comes, the chair 91 in the booth 80 comes close to the entrance portion 80E.

Consequently, the chair 91 in front of the desk 92 is moved to the front of the entrance portion 80E of the booth 80, and a user using the booth 80 can easily sit on the chair 91.

In particular, in a case where a lame user uses the booth 80, the user does not have to move in the booth 80, or a movement distance of this user in the booth 80 becomes smaller, and thus the user can easily sit on the chair 91.

It is also assumed that a user using a wheelchair uses the booth 80, and, in a case where the chair 91 is moved to the front of the entrance portion 80E of the booth 80, it becomes easy to transfer from the wheelchair to the chair 91, and thus the user can easily sit on the chair 91.

As shown in FIG. 9, a guide portion 91B that guides the chair 91, such as a guide rail, is provided on the floor surface 20B of the booth 80. In the present exemplary embodiment, the guide portion 91B is used to guide the chair 91 that is being moved.

In the present exemplary embodiment, a movement mechanism 400 that moves the chair 91 is provided.

Consequently, the chair 91 is moved from the front of the desk 92 toward the entrance portion 80E, and the chair 91 is moved from the entrance portion 80E toward the front of the desk 92.

The movement mechanism 400 is not particularly limited, and a well-known mechanism may be used.

Specifically, as the movement mechanism 400, for example, a rack and pinion mechanism, a mechanism that moves the chair 91 by winding a wire connected to the chair 91, and a mechanism that moves the chair 91 by using a biasing member such as a spring may be used.

Figure 10:
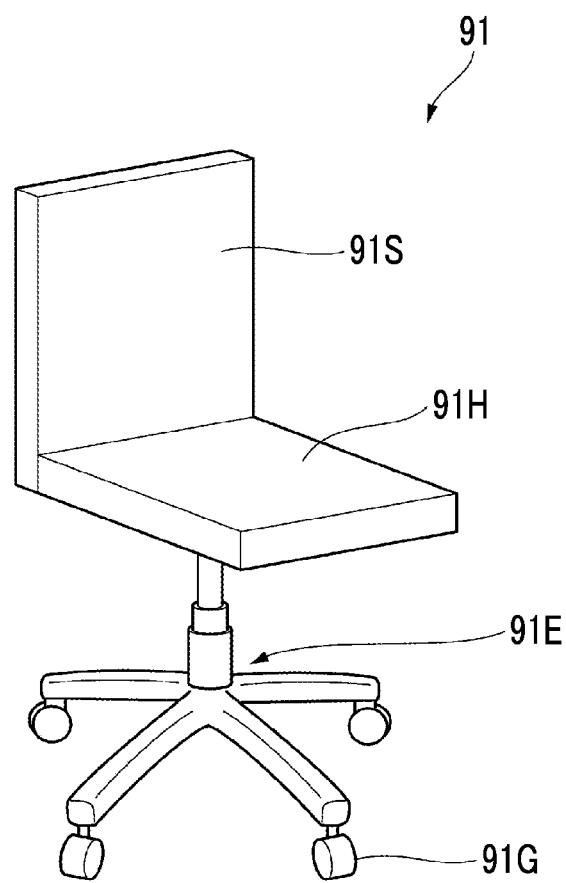
FIG. 10 is a diagram showing another configuration example of the chair.

For example, the chair 91 may be provided with a drive source such that the chair 91 can move by itself. More specifically, for example, as shown in FIG. 10 (a diagram showing another configuration example of the chair 91), wheels 91G may be provided on a leg 91E of the chair 91, and the wheels 91G may be rotated to move the chair 91.

In a case where the wheels 91G provided at the chair 91 are rotated, motors may be installed in the wheels 91G and the wheels 91G may be rotated by the motors. In other words, the chair 91 may be moved by rotating the wheels 91G with so-called in-wheel motors.

In the present exemplary embodiment, after moving the chair 91 to the entrance portion 80E side, the CPU 111 gives an instruction for moving the chair 91 to the front of the desk 92 in a case where a predefined condition is satisfied. In other words, the CPU 111 gives an instruction for returning the chair 91 that has been moved to the entrance portion 80E side to the front of the desk 92 in a case where the predefined condition is satisfied.

In other words, after the CPU 111 gives an instruction for placing the chair 91 in front of the entrance portion 80E, the CPU 111 gives an instruction for placing the chair 91 in front of the desk 92 in a case where the predefined condition is satisfied.

In a case where this instruction is given, the booth control device 89 moves the chair 91 in front of the entrance portion 80E to the front of the desk 92. More specifically, the booth control device 89 performs a process of moving the chair 91 that is placed in front of the entrance portion 80E and on which a user (not shown) is sitting to the front of the desk 92.

Here, for example, the chair 91 may be moved to the front of the desk 92 after it is detected that the user is sitting on the chair 91.

Detection of the user sitting on the chair 91 is performed by installing, for example, a seating sensor (not shown) on the chair 91 and based on output from the seating sensor. For example, it may be detected that the user is sitting on the chair 91 by analyzing an image obtained by the imaging device 24 (refer to FIG. 2).

In the present exemplary embodiment, a case where the CPU 111 provided in the space management server 5 gives an instruction for change related to a disposed object will be described as an example.

However, the present exemplary embodiment is not limited to this, and the CPU 891 (refer to FIG. 6) provided in the booth 80 may acquire the reservation information stored in the space management server 5 from the space management server 5, and the CPU 891 may give an instruction for change related to a disposed object based on the acquired reservation information.

Figure 11:
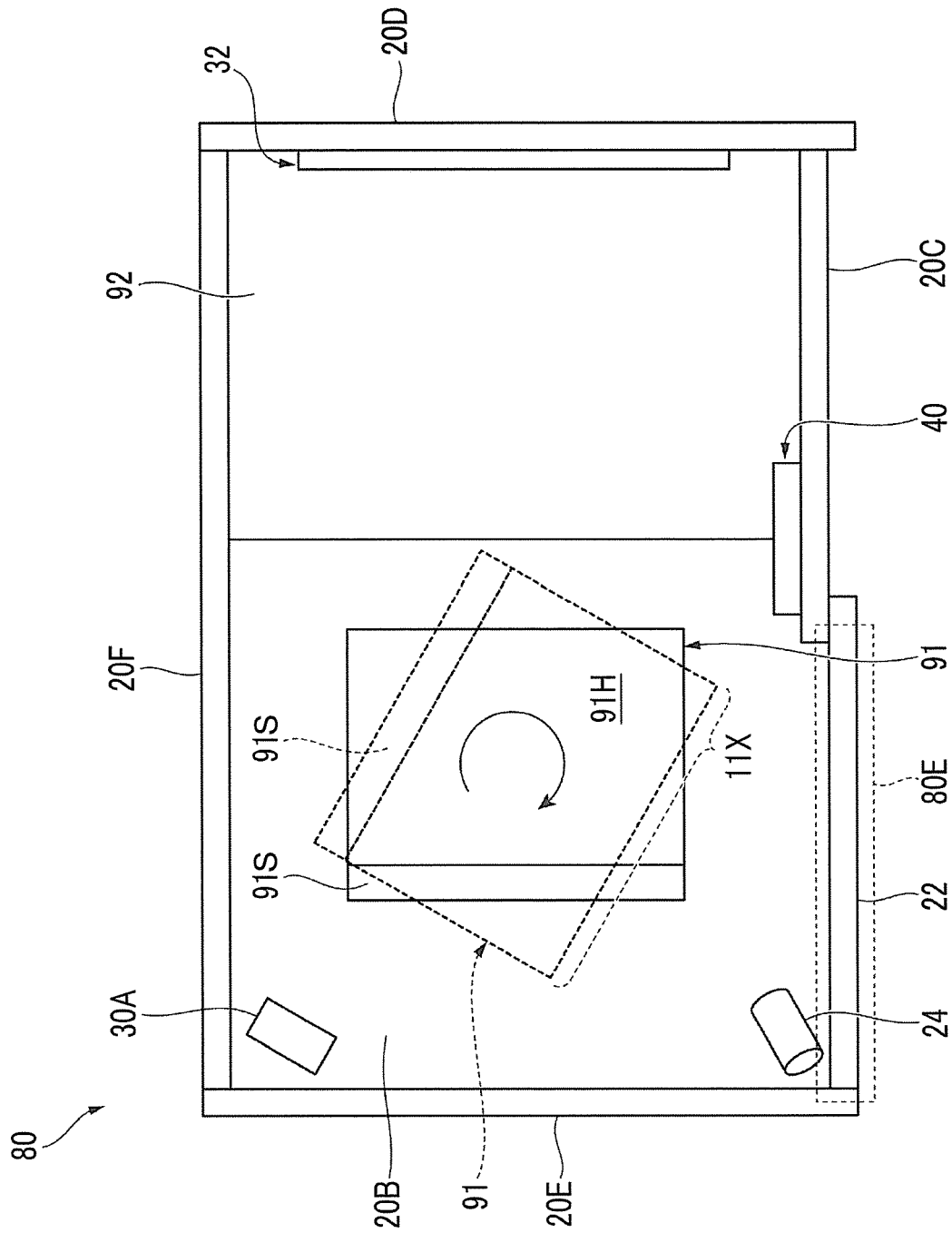
FIG. 11 is a diagram showing another configuration example of the booth.

FIG. 11 is a diagram showing another configuration example of the booth 80.

In this configuration example shown in FIG. 11, a case where the CPU 111 gives an instruction for changing an orientation of a disposed object based on acquired reservation information is exemplified.

More specifically, in the configuration example, a case where the CPU 111 gives an instruction for changing an orientation of the chair 91 that is an example of a disposed object based on the acquired reservation information is exemplified.

More specifically, in this configuration example, the CPU 111 gives an instruction such that an orientation of the chair 91 is changed at the reservation start time and/or the reservation end time for the booth 80.

In this case, in response to the instruction, the booth control device 89 changes the orientation of the chair 91 at the reservation start time and/or the reservation end time for the booth 80.

More specifically, the booth control device 89 rotates apart of the chair 91 or the entire chair 91 at the reservation start time and/or the reservation end time for the booth 80 to change the orientation of the chair 91.

The rotation of the chair 91 may be performed by rotating a part of the chair 91, for example, only the portion of the seat surface 91H, or the entire chair 91 including the leg 91E (refer to FIG. 10).

Here, in a case where a part of the chair 91 such as only the portion of the seat surface 91H is rotated, for example, a drive source such as a motor is provided in a pedestal of the chair 91, and a part of the chair 91 is rotated by the drive source.

In a case where the entire chair 91 including the leg 91E is rotated, for example, a rotation mechanism is installed on the floor surface 20B (refer to FIG. 11) of the booth 80, and the chair 91 is rotated by the rotation mechanism.

In a case where the entire chair 91 including the leg is rotated, for example, as shown in FIG. 10, the wheels 91G may be provided on the leg 91E of the chair 91, and chair 91 may be rotated by rotating each of the wheels 91G.

In a case where the wheels 91G are provided on the leg 91E of the chair 91, in-wheel motors may be installed inside the wheels 91G, and the wheels 91G may be rotated by the in-wheel motors to rotate the chair 91.

Ina case of detailed description of an instruction given by the CPU 111, the CPU 111 gives an instruction for the causes the chair 91 such that the chair 91 in the booth 80 faces the entrance portion 80E of the booth 80, for example, at the reservation start time and/or at the reservation end time.

A timing at which the CPU 111 gives an instruction for change related to a disposed object is not particularly limited, and the instruction for change related to the disposed object may be given at a timing at which the reservation start time or the timing of the reservation end time comes.

The present exemplary embodiment is not limited to this, and a timing at which the CPU 111 gives an instruction for change related to a disposed object may be a timing before the reservation start time, or a timing before the reservation end time.

More specifically, the timing at which the CPU 111 gives an instruction for change related to the disposed object may be a timing before the reservation start time, such as a timing immediately after a user makes a reservation for the booth 80.

In a case where there is an instruction from the CPU 111, the booth control device 89 performs control of changing the orientation of the chair 91 at the reservation start time and/or the reservation end time for the booth 80 in response to the instruction. Consequently, the chair 91 facing the desk 92 faces the entrance portion 80E.

Here, the orientation of the chair 91 may be changed at both the timings of the reservation start time for and the reservation end time the booth 80, or only at one of the timings.

The sentence "the chair 91 faces the entrance portion 80E of the booth 80" refers to a state in which a portion (a portion indicated by the reference sign 11X in FIG. 11) of the chair 91 located on the user side when the user sits on the chair 91 is located on the entrance portion 80E side of the booth 80.

In other words, the sentence "the chair 91 faces the entrance portion 80E of the booth 80" refers to a state in which a portion located on the front side in a case where the chair 91 is viewed from the front is located on the entrance portion 80E side of the booth 80.

The phrase "when the reservation start time comes" is not limited to a timing at which the reservation start time comes, and includes a timing before the reservation start time and also includes a timing after the reservation start time.

In other words, the phrase "when the reservation start time comes" is not limited to the reservation start time, and also includes timings before and after the reservation start time.

The phrase "when the reservation end time comes" is not limited to a timing at which the reservation end time comes, and includes a timing before the reservation end time and also includes a timing after the reservation end time.

In other words, the phrase "when the reservation end time comes" is not limited to the reservation end time, and also includes timings before and after the reservation end time.

In the present exemplary embodiment, the CPU 111 gives an instruction such that the chair 91 faces the entrance portion 80E of the booth 80, and then the chair 91 faces the desk 92 in a case where a predefined condition is satisfied.

Specifically, the CPU 111 gives an instruction for directing the chair 91 toward the desk 92 in the booth 80 in a case where a predefined condition is satisfied, for example, the user sits on the chair 91.

As described above, detection of the user sitting on the chair 91 is performed by installing, for example, a seating sensor on the chair 91 and based on output from the seating sensor.

For example, it may be detected that the user sits on the chair 91 by obtaining an image of the inside of the booth 80 from the imaging device 24 (refer to FIG. 2) and analyzing the image.

In the above description, in a case where the user sits on the chair 91, the case where the chair 91 is moved toward the desk 92 or the chair 91 faces the desk 92 by rotating the chair 91 has been described as an example.

However, regardless of whether or not the user sits on the chair 91, in a case where a predefined timing comes, the chair 91 may be moved toward the desk 92, or the chair 91 may face the desk 92 by rotating the chair 91.

Figure 12:
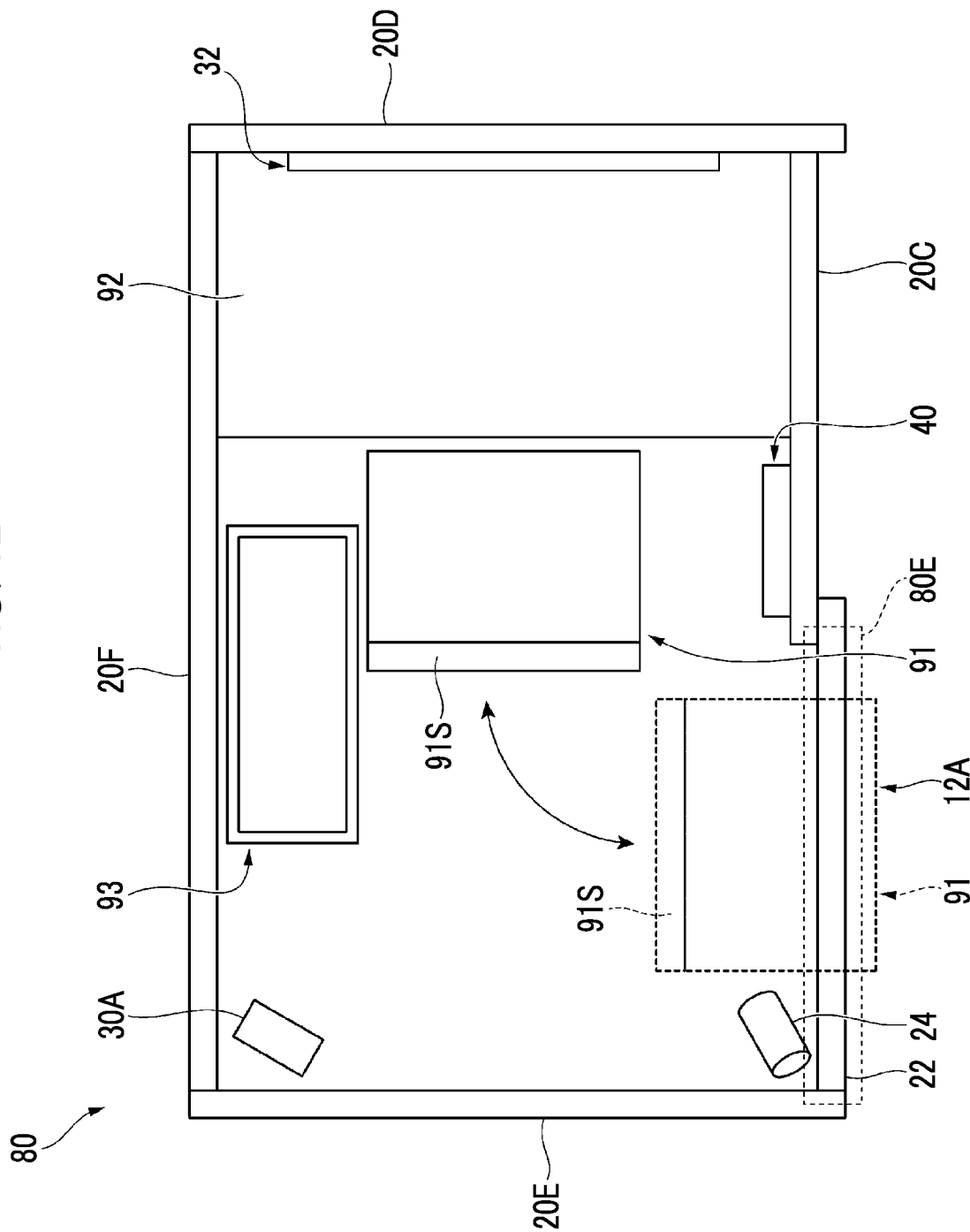
FIG. 12 is a diagram showing still another configuration example of the booth.

In addition, as shown in FIG. 12 (a diagram showing still another configuration example of the booth 80), the CPU 111 may give an instruction for change related to the chair 91 such that the chair 91 comes close to the entrance portion 80E of the booth 80 and the chair 91 faces the entrance portion 80E of the booth 80.

The CPU 111 may give an instruction for change related to the chair 91 such that a part of the chair 91 comes out of the booth 80, as indicated by the reference sign 12A in FIG. 12.

Also in the configuration example shown in FIG. 12, in the same manner as described, in a case where a predefined condition is satisfied, for example, the user sits on the chair 91, the chair 91 is moved toward the desk 92, and the chair 91 faces the desk 92. In other words, the chair 91 returns to its original state.

In addition, the CPU 111 may give an instruction for changing a positional relationship between an inner wall of the booth 80 and a disposed object disposed in the booth 80 based on acquired reservation information.

Specifically, for example, as shown in FIG. 13 (a diagram showing still another configuration example of the booth 80), the CPU 111 may give an instruction for changing a positional relationship between an inner wall 80X extending in the vertical direction of the booth 80 and the desk 92 disposed in the booth 80 based on the acquired reservation information.

In this example, the desk 92 in the booth 80 is smaller than the desk 92 described above. In this example, the CPU 111 gives an instruction for moving the desk 92 (refer to a part (A) in FIG. 13) that has been close to the inner wall 80X to a location indicated by the reference sign 13X of a part (B) in FIG. 13.

Consequently, for example, when the reservation start time for the booth 80 comes, the desk 92 is moved to the location indicated by the reference sign 13X. In other words, the desk 92 is moved to the center of the booth 80 in the width direction.

The desk 92 is an example of a disposed object that touches belongings of a user who uses the booth 80. A belonging such as a smartphone or a notebook personal computer (PC) owned by the user is placed on the desk 92, and the desk 92 touches the belonging and supports the belonging from below.

Other examples of the disposed object that touches belongings of a user include a hanger (not shown) that supports clothing and the luggage container 93 (refer to FIG. 3).

In this configuration example shown in FIG. 13, the CPU 111 further acquires information regarding a purpose of use of the booth 80 that is specified by the acquired reservation information.

Ina case where the purpose of use is a predefined specific purpose, the CPU 111 gives an instruction for changing a position of the desk 92 that is an example of a disposed object.

Specifically, in this example, a case where the purpose of use specified by the information regarding the purpose of use is a meeting is exemplified. In this case, the CPU 111 gives an instruction for changing a position of the desk 92 disposed in the booth 80.

Regarding the information regarding the purpose of use of the booth 80, for example, when the user reserves the booth 80, the user enters the information regarding the purpose of use via the user terminal 4 (refer to FIG. 1).

In the present exemplary embodiment, the reservation information is stored in the information storage device 102 (refer to FIG. 4) in a state in which the information regarding the purpose of use is included in the reservation information.

The CPU 111 acquires the information regarding the purpose of use included in the reservation information stored in the information storage device 102, and gives an instruction for changing a position of the desk 92 disposed in the booth 80 in a case where the purpose of use is, for example, a meeting.

Consequently, in the present exemplary embodiment, for example, when the reservation start time comes, the booth control device 89 moves the desk 92 to the center of the booth 80 in the width direction as shown the part (B) in FIG. 13. Consequently, users can sit on both sides of the desk 92, and thus it becomes easy for a plurality of users to have a meeting.

Specifically, in this example, the users can sit on both sides of the sidewall 20E side of the desk 92 and the sidewall 20D side of the desk 92, and thus it becomes easy for a plurality of users to have a meeting.

Here, in this configuration example, a folded chair is prepared in the booth 80 such that a user can sit on the sidewall 20D side of the desk 92. A user sitting on the sidewall 20D side of the desk 92 unfolds and uses this chair. The part (B) in FIG. 13, the unfolded chair is indicated by the reference sign 13Y.

Similarly, to the chair 91 shown in FIG. 10, the desk 92 is moved by, for example, providing wheels that are rotated by a drive source such as a motor on legs of the desk 92 and rotating the wheels.

In addition, for example, a guide portion such as a guide rail extending along a movement direction of the desk 92 may be provided, a well-known drive mechanism such as a rack and pinion may be provided, the desk 92 may be moved by using these.

As described above, in-wheel motors may be installed inside the wheels provided on the legs of the desk 92, and the in-wheel motors may be driven to move the desk 92.

Here, regarding the desk 92, a case where a position of the desk 92 is changed has been described as an example, but an orientation may be changed in addition to the change of the position. Both the position of the desk 92 and the orientation of the desk 92 may be changed.

In addition, the CPU 111 may give an instruction for change related to a disposed object based on information regarding a user specified from the acquired reservation information.

In the present exemplary embodiment, information regarding a user who has reserved the booth 80 is registered in the information storage device 102 (refer to FIG. 4) of the space management server 5, and the CPU 111 refers to the information storage device 102 and acquires the information regarding the user who has reserved the booth 80.

Specifically, in the present exemplary embodiment, the user enters own information in advance via the user terminal 4 or the like. The entered information is registered in the information storage device 102 of the space management server 5.

The CPU 111 refers to the information storage device 102 and acquires the information regarding the user who has reserved the booth 80.

In addition, the information regarding the user may be entered by the user at the time of reserving the booth 80 (may be applied for), and the CPU 111 may obtain the entered information and acquire the information regarding the user.

Examples of the "information regarding the user" include information regarding a physique of the user such as height and weight, and information such as the age and gender of the user.

Examples of the "information regarding the user" include information regarding the user's body, such as the presence or absence of illness and the presence or absence of injury.

Example of the "information regarding the user" include information regarding whether or not an apparatus is used, such as information regarding whether or not a wheelchair is used.

The CPU 111 gives an instruction for change related to a disposed object based on the acquired information (information regarding the user).

Specifically, the CPU 111 gives an instruction for changing a position of the disposed object or rotating the disposed object as described above based on the acquired information regarding the user.

The CPU 111 gives an instruction for changing a shape of the disposed object based on the acquired information regarding the user.

FIG. 14 is a diagram showing an example of a display screen displayed on the user terminal 4 when the booth 80 is reserved.

This display screen exemplifies a case where a user is lame and makes an application to use the booth 80 in a disabled mode.

In this case, the CPU 111 acquires information indicating that the user is disabled as the information regarding the user. In this case, the CPU 111 gives an instruction for rotating the chair 91 or moving the chair 91. In this case, the CPU 111 gives an instruction for changing a shape of the chair 91 or the desk 92.

In the above description, the case where the chair 91 or the desk 92 is moved or rotated has been described as an example, but the present exemplary embodiment is not limited to the movement or rotation, and a shape of a disposed object may be changed. In a case where the shape of the chair 91 or the desk 92 is changed, the shape of the chair 91 or the desk 92 becomes a shape appropriate for the user's body.

Here, the case of changing the shape of the disposed object in a case where there is an application to use the booth 80 in the disabled mode has been described as an example, but, in addition to this, for example, the shape of the disposed object such as the chair 91 or the desk 92 may be changed based on information regarding the physique of the user. In this case, the shape of the disposed object becomes a shape appropriate for the physique of the user.

Examples of the "change of the shape of the disposed object" include a process of moving the seat surface 91H of the chair 91 up and down, and a process of moving the top plate 92A (refer to FIG. 9) of the desk 92 up and down.

Examples of the "change of the shape of the disposed object" include a process of folding the chair 91 or the desk 92, and a process of tilting the seat surface 91H of the chair 91 or the top plate 92A of the desk 92.

In addition, the CPU 111 gives an instruction for changing the shape of the disposed object, and, for example, when the reservation end time specified by the acquired reservation information comes, the shape of the disposed object may be a shape of the disposed object that is difficult for the user to use.

Specifically, for example, in a case where the reservation end time comes, the CPU 111 gives, to the booth control device 89, an instruction for tilting the top plate 92A of the desk 92 that is the disposed object with respect to the horizontal direction.

Consequently, for example, as shown in FIG. 15 (a diagram showing a state in a case where the desk 92 is viewed from a direction indicated by an arrow XV in FIG. 9), the shape of the desk 92 becomes a shape in which the top plate 92A is tilted and thus becomes a shape of the desk 92 that is difficult for the user to use compared with the shape before the instruction for changing the shape.

Consequently, the user in the booth 80 is made to recognize that the reservation of this user is completed.

Although the case where the top plate 92A of the desk 92 is tilted has been described here as an example, a target to be tilted is not limited to the desk 92, and a part of the chair 91 may be tilted. Specifically, for example, the seat surface 91H of the chair 91 may be tilted with respect to the horizontal direction, or a tilt angle of the backrest 91S of the chair 91 may be increased or decreased.

This also causes the user in the booth 80 to recognize that the reservation of this user is completed.

A mechanism that tilts the top plate 92A, the seat surface 91H, and the backrest 91S is not particularly limited, and a well-known mechanism may be used.

In the above description, the case where a position of a disposed object in the booth 80 is changed uniformly has been described. In other words, in the above description, the case where uniform change is performed on the disposed object in the booth 80 at the reservation start time or the reservation end time has been described.

However, the present exemplary embodiment is not limited to this, and, for example, in a case where the information regarding the user satisfies a predefined specific condition, change may be performed on the disposed object in the booth 80.

In this case, in a case where the specific predefined condition is not satisfied, change on the disposed object is not performed.

In the above description, the case where the chair 91 or the desk 92 is moved, rotated, and changed in shape has been described as an example, but a target to be moved is not limited to the desk 92 or the chair 91.

Any of disposed objects disposed in the booth 80 is a target to be moved, rotated, or changed in shape.

Specifically, for example, the monitor 32 (refer to FIG. 9), the hanger (not shown), the speaker 30A, the luggage container 93, and the handrail (not shown) are also targets to be moved, rotated, and changed in shape.

In addition, the CPU 111 may acquire information regarding an object placed outside the booth 80 by a user who uses the booth 80.

It is assumed that a user's belonging such as such as a wheelchair or a bicycle is not inside the booth 80 but is placed outside the booth 80 depending on a size of the booth 80.

In this case, the CPU 111 acquires information regarding the wheelchair or the bicycle.

In a case where this process is performed, as shown in FIG. 16 (a diagram showing still another configuration example of the booth 80), the booth 80 is provided with an external imaging device 80Y that acquires an image of the outside of the booth 80.

The CPU 111 analyzes the image obtained by the external imaging device 80Y and acquires information regarding an object placed outside by the user.

The CPU 111 performs a predefined notification process in a case where the object placed outside by the user is brought into a predefined state or in a case where a surrounding situation of the object becomes a predefined situation.

For example, the CPU 111 performs a process of notifying the user via the user terminal 4 (refer to FIG. 1), The monitor 32 (refer to FIG. 9), the speaker 30A, or the like in a case where an object placed outside by the user is lost due to theft or the like, or in a case where the object placed outside by the user is damaged due to mischief or the like.

Specifically, in this case, the CPU 111 notifies the user in the booth 80 that, for example, an abnormality has occurred in the object placed outside. This notification may be a mere warning sound, or may be a guidance using voice or an image.

The CPU 111 also notifies an administrator of the booth 80 in a case where the object placed outside by the user is lost or damaged.

As described above, the CPU 111 also performs a predefined notification process even in a case where a surrounding situation of the object placed outside by the user becomes a predefined situation.

Specifically, for example, in a case where a suspicious person comes near the object placed outside by the user, the CPU 111 notifies the user via the user terminal 4, the monitor 32, or the speaker 30A in the same manner as described above.

More specifically, for example, in a case where a person other than the user touches the object placed outside, the CPU 111 notifies the user that an abnormality has occurred via the user terminal 4, the monitor 32, or the speaker 30A.

The CPU 111 may perform a process of notifying the user via the user terminal 4, the monitor 32, or the speaker 30A, for example, even in a case where the weather outside the booth 80 begins to be rough.

In addition, the CPU 111 may send a control signal to the object placed outside and activate an electronic lock provided on the object to lock the object.

This locking may be performed, for example, in a case where an unlocked state continues for a predefined time, or in a case where a suspicious person approaches the object outside the booth 80 as described above.

The locking may be performed as soon as the user places the object outside the booth 80.

In the above description, the case where the wheelchair is placed outside the booth 80 has been described, but, in a case where the booth 80 is large, it is also assumed that the user enters the inside of the booth 80 while riding on the wheelchair.

In this case, in order to make it easier for the wheelchair to enter the booth 80, for example, as shown in FIG. 17 (a diagram showing still another configuration example of the booth 80), a guide member 80N having a slope may be moved to the front of the entrance portion 80E.

In the example shown in FIG. 17, the case where the guide member 80N appears from below the floor surface 20B of the booth 80 has been described as an example. However, the guide member 80N may be accommodated in the booth 80, and the guide member 80N may appear from the inside of the booth 80.

The guide member 80N may be located outside the booth 80 and at a location other than the front of the entrance portion 80E, and, when a user uses the booth 80, the guide member 80N may be moved from the location other than the front of the entrance portion 80E to the front of the entrance portion 80E.

In the present exemplary embodiment, the guide member 80N having a slope has been described as an example, but the present exemplary embodiment is not limited to this, and a member having a stair-like step may be moved to the front of the entrance portion 80E.

In addition, a handrail may be provided inside or outside the booth 80, and the handrail may be moved to a location where the handrail easily used by a user based on information regarding the user (for example, information such as height) specified from the reservation information for the booth 80.

For example, in order to avoid interference between the wheelchair entering the booth 80 and the chair 91 in the booth 80, the chair 91 may be folded by giving an instruction for changing the shape of the chair 91 in the booth 80.

An instruction for moving the chair 91 in the booth 80 may be given, and thus the chair 91 may be accommodated in a predefined accommodation portion.

In addition, the CPU 111 may perform a process of notifying, of predefined information, a person who has come to the booth 80 together with a user who uses the booth 80 and is outside the booth 80.

Specifically, the CPU 111 may perform a process of notifying, of predefined information, for example, a companion who has come to the booth 80 together with a user who uses a wheelchair and is outside the booth 80.

More specifically, the CPU 111 may perform a process of notifying the companion of predefined information, for example, when the use end time for the booth 80 comes.

Specifically, the CPU 111 may transmit information to, for example, the user terminal 4 owned by the companion, and notify the companion, for example, that the use end time has come.

Ina case where a user in the booth 80 performs a specific operation, for example, in a case where the user in the booth 80 operates a switch (not shown) installed in the booth 80, the CPU 111 may perform a process of notifying the companion of predefined information.

More specifically, the CPU 111 transmits information to, for example, the user terminal 4 owned by the companion, and notifies the companion, for example, that the user in the booth 80 is calling the companion or an abnormality has occurred in the booth 80.

Others

In the above description, the case where a position, an orientation, a shape, or the like of the disposed object is changed has been described, but the present disclosure is not limited to this, and, for example, the disposed object in the booth 80 may be changed to another disposed object.

More specifically, for example, a plurality of disposed objects may be prepared in the booth 80, and one disposed object in the booth 80 may be changed to another disposed object according to acquired reservation information.

In this case, accommodation portions accommodating disposed objects are provided, a disposed object that is no longer used due to the change is accommodated in a free accommodation portion, and a disposed object newly used due to the change is extracted from another accommodation portion.

In the configuration example shown in FIG. 11, the booth 80 in which the entrance portion 80E is located on the side of a user (not shown) in a state of sitting on the chair 91 and facing the desk 92 has been described as an example.

However, a configuration of the booth 80 is not limited to this, and, as shown in FIG. 18 (a diagram showing still another configuration example of the booth 80), the booth 80 may have a configuration in which the entrance portion 80E may be located behind a user sitting on the chair 91 and facing a desk 92.

In this configuration example, in a case where the chair 91 is rotated, for example, the chair 91 may be rotated by 180 degrees. Also in this case, the chair 91 may be moved in the same manner as described above, or the chair 91 may be moved such that the chair 91 comes close to the entrance portion 80E.

Also in this configuration example, there may be a configuration in which the shape of the chair 91 is changed as described above.

In the booth 80 shown in FIG. 18, in the same manner as described above, the desk 92 or a disposed object may be moved, rotated, changed in shape, and changed to another disposed object.

The CPU 111 may also open and close the door 22 based on the reservation information for the booth 80.

Specifically, the CPU 111 may give an instruction for opening and closing the door 22, for example, when the reservation start time for the booth 80 comes and/or the reservation end time for the booth 80 comes.

In this case, the booth control device 89 opens and closes the door 22 of the booth 80 when the reservation start time for the booth 80 comes and/or the reservation end time for the booth 80 comes.

More specifically, in this case, a mechanism for opening and closing the door 22 is provided in the booth 80, and a control signal is output from the booth control device 89 to this mechanism to open and close the door 22.

In this case, the door 22 is automatically opened and closed when the reservation start time for the booth 80 comes and/or the reservation end time for the booth 80 comes.

In a case of opening the door 22 at the reservation start time, for example, the door 22 may be opened after the chair 91 (refer to FIG. 11) in the booth 80 faces the entrance portion 80E.

In this case, when the door 22 is opened, the chair 91 is already facing the entrance portion 80E, and, in a case where the door 22 is opened, the user can immediately sit on the chair 91.

When the door 22 is opened at the reservation end time for the booth 80, for example, the door 22 may be opened after the chair 91 in the booth 80 faces the entrance portion 80E.

In a case where the door 22 is opened in a state in which the chair 91 in the booth 80 is not facing the entrance portion 80E, the door 22 is opened in a state in which the user's line of sight does not reach the entrance portion 80E.

In this case, there is concern that a luggage inside the booth 80 may be easily stolen by a person outside the booth 80 through the opened entrance portion 80E.

On the other hand, in a case where the door 22 is opened after the chair 91 faces the entrance portion 80E, the user's line of sight can easily reach the entrance portion 80E, and thus theft is less likely to occur.

In a case where the door 22 is opened and the chair 91 is moved to approach the entrance portion 80E, for example, the chair 91 may be moved after the door 22 is opened.

For example, as shown in FIG. 19 (a diagram showing still another configuration example of the booth 80), in a case of a configuration in which the door 22 is a hinged door that rotates around a hinge and the door 22 enters the inside of the booth 80, in a case where the door 22 is opened in a state in which the chair 91 has been moved to the entrance portion 80E side, the door 22 and the chair 91 may interfere with each other.

In contrast, in a configuration in which the chair 91 is moved after the door 22 is opened, interference between the door 22 and the chair 91 can be avoided.

When the door 22 is closed, for example, the door 22 may be closed after the chair 91 is moved to the desk 92 side.

In a configuration in which the door 22 is a hinged door that rotates around a hinge and the door 22 enters the inside of the booth 80, in a case where the door 22 is closed in a state in which the chair 91 has been moved to the entrance portion 80E side, the door 22 and the chair 91 may interfere with each other.

In contrast, in a case where the door 22 is closed after the chair 91 is moved to the desk 92 side, interference between the door 22 and the chair 91 can be avoided.

Movement of a disposed object, change of an orientation of the disposed object, change of a shape of the disposed object, and change to another disposed object are not limited to being performed uniformly, and may be performed in a case where there is a permission from a user.

In a case where a predefined condition is satisfied during processes such as movement of a disposed object, change of an orientation of the disposed object, change of a shape of the disposed object, and change to another disposed object, these processes may be stopped.

For example, in a case where a user stands up from the chair 91 and the user heads for the entrance portion 80E while the chair 91 on which the user is sitting is being moved toward the entrance portion 80E, the movement of the chair 91 may be stopped.

For example, in a case where the user stands up from the chair 91 and the user heads for the entrance portion 80E while the chair 91 on which the user is sitting is being rotated to face the entrance portion 80E side, the rotation of the chair 91 may also be stopped.

Detection of the user standing up from the chair 91 and heading for the entrance portion 80E is performed, for example, based on output from a seating sensor. Detection of the user standing up from the chair 91 and heading for the entrance portion 80E is performed, for example, by analyzing an image obtained by the imaging device 24 (refer to FIG. 2).

In addition, detection of the user standing up from the chair 91 and heading for the entrance portion 80E may be performed based on e output from the opening/closing sensor S1 (refer to FIG. 2) of the door 22.

In this case, in a case where the output from the opening/closing sensor S1 is output indicating that the door 22 has been opened, it is determined that the user stands up from the chair 91 and heads the entrance portion 80E.

In the above description, generally, the case of giving an instruction for change related to a disposed object disposed in the booth 80 has been described as an example, but an instruction for change related to a disposed object disposed outside the booth 80 may be given based on reservation information for the booth 80.

Specifically, for example, as shown in FIG. 20 (a diagram showing still another configuration example of the booth 80), a plurality of light sources 490 arranged along a path R through which a user heads for the booth 80 may be provided, and a process of turning on the light sources 490 may be performed when the reservation start time for the booth 80 comes.

In a case where the light sources 490 are turned on, for example, the light sources 490 may be turned on such that lighting locations are moved in order in a direction indicated by an arrow 200A (a direction in which the booth 80 is located).

For example, as shown in FIG. 20, a speaker 495 may be installed outside the booth 80, and a guidance for guiding a user to the booth 80 may be performed from the speaker 495 when the reservation start time for the booth 80 comes.

For example, in a case where a user who intends to use the booth 80 is a user who is using a wheelchair, a notification process using the speaker 495 may be performed such that a space for placing the wheelchair is secured.

More specifically, for example, a notification for moving a bicycle or the like that is stopped in a space for placing a wheelchair may be provided such that the space for placing a wheelchair is secured.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
   a processor configured to:
   acquire reservation information for a booth comprising an electronically-controlled hinged door that rotates around a hinge and enters an inside of the booth and an electronically-controlled chair that interferes with the hinged door when being moved to an entrance portion of the booth,
   give an instruction for opening the hinged door via a motor and then moving the chair via motorized wheels to the entrance portion of the booth based on the acquired reservation information when a reservation start time comes and/or when a reservation end time comes,
   and
   give an instruction for moving the chair toward a desk, and then closing the hinged door based on the acquired reservation information when the reservation start time comes and/or when the reservation end time comes.

2. The information processing system according to claim 1, wherein the processor is configured to:
   give an instruction for changing an orientation of the chair based on the acquired reservation information.

3. The information processing system according to claim 2, wherein the processor is configured to:
   give the instruction such that the orientation of the chair is changed when the reservation start time and/or the reservation end time for the booth comes.

4. The information processing system according to claim 3, wherein the processor is configured to
   give the instruction such that the chair in the booth faces an opening of the booth when the reservation start time comes and/or when the reservation end time comes.

5. The information processing system according to claim 1, wherein the processor is configured to:
   give an instruction for changing a shape of the chair based on the acquired reservation information.

6. The information processing system according to claim 5, wherein the processor is configured to:
   give the instruction for changing the shape of the chair based on information regarding a user specified from the acquired reservation information.

7. The information processing system according to claim 5, wherein the processor is configured to:
   give the instruction for tilting a top plate of the desk when the reservation end time specified by the acquired reservation information comes.

8. The information processing system according to claim 1, wherein the processor is configured to:
give an instruction for change related to the chair that touches the user using the booth or touches a belonging of the user based on the acquired reservation information.

9. The information processing system according to claim 8, wherein the processor is configured to:
give an instruction for change related to the chair and/or the desk disposed in the booth based on the acquired reservation information.

10. The information processing system according to claim 1, wherein the processor is configured to:
give an instruction for change related to the chair based on information regarding a purpose of use of the booth that is specified by the acquired reservation information.

11. The information processing system according to claim 10, wherein the processor is configured to:
give an instruction for changing a position of the desk disposed in the booth in a case where the purpose of use is a meeting.

12. The information processing system according to claim 1, wherein the processor is configured to:
give an instruction for change related to the chair based on information regarding the user specified from the acquired reservation information.

13. The information processing system according to claim 1, wherein the processor is configured to:
acquire information regarding an object placed outside the booth by the user using the booth.

14. The information processing system according to claim 13, wherein the processor is configured to:
perform a predefined notification process in a case where the object placed outside the booth is brought into a predefined state or a surrounding situation of the object becomes a predefined situation.

15. The information processing system according to claim 1, wherein the processor is configured to:
perform a process of notifying, of predefined information, a person who comes to the booth together with the user using the booth and is outside the booth.

16. A non-transitory computer readable medium storing a program causing a computer to realize:

a function of acquiring reservation information for a booth comprising an electronically-controlled hinged door that rotates around a hinge and enters an inside of the booth and an electronically-controlled chair that interferes with the hinged door when being moved to an entrance portion of the booth; and a function of giving an instruction for opening the hinged door via a motor and then moving the chair via motorized wheels to the entrance portion of the booth based on the acquired reservation information when a reservation start time comes and/or when a reservation end time comes, and giving an instruction for moving the chair toward a desk, and then closing the hinged door based on the acquired reservation information when the reservation start time comes and/or when the reservation end time comes.

17. An information processing method comprising:

acquiring reservation information for a booth comprising an electronically-controlled hinged door that rotates around a hinge and enters an inside of the booth and an electronically-controlled chair that interferes with the hinged door when being moved to an entrance portion of the booth; and giving an instruction for opening the hinged door via a motor and then moving the chair via motorized wheels to the entrance portion of the booth based on the acquired reservation information when a reservation start time comes and/or when a reservation end time comes, and giving an instruction for moving the chair toward a desk, and then closing the hinged door based on the acquired reservation information when the reservation start time comes and/or when the reservation end time comes.

* * * * *